(12) United States Patent
Ikushima

(10) Patent No.: US 8,047,710 B2
(45) Date of Patent: Nov. 1, 2011

(54) ELECTRONIC DEVICE

(75) Inventor: Kimiya Ikushima, Osaka (JP)

(73) Assignee: Panasonic Corporation, Osaka (JP)

( * ) Notice: Subject to any disclaimer, the term of this patent is extended or adjusted under 35 U.S.C. 154(b) by 582 days.

(21) Appl. No.: 12/297,075

(22) PCT Filed: Oct. 3, 2007

(86) PCT No.: PCT/JP2007/069392
§ 371 (c)(1),
(2), (4) Date: Oct. 14, 2008

(87) PCT Pub. No.: WO2008/044578
PCT Pub. Date: Apr. 17, 2008

(65) Prior Publication Data
US 2009/0262778 A1    Oct. 22, 2009

(30) Foreign Application Priority Data
Oct. 11, 2006    (JP) .................... 2006-277588

(51) Int. Cl.
*G01J 1/02*    (2006.01)
*G01J 5/12*    (2006.01)
*G01J 5/20*    (2006.01)
*G01J 5/34*    (2006.01)

(52) U.S. Cl. .............. 374/121; 374/165; 250/338.1; 250/338.4

(58) Field of Classification Search ............. 374/120, 374/121, 165, 179; 250/332, 338.1, 338.4, 250/339.01, 339.02, 370.01, 370.08
See application file for complete search history.

(56) References Cited

U.S. PATENT DOCUMENTS

| | | | |
|---|---|---|---|
| 5,656,816 A * | 8/1997 | Tanaka | 250/339.01 |
| 6,031,231 A * | 2/2000 | Kimata et al. | 250/332 |
| 6,080,988 A | 6/2000 | Ishizuya et al. | |
| 6,307,194 B1 * | 10/2001 | Fitzgibbons et al. | 250/208.1 |
| 6,891,503 B1 | 5/2005 | Savry et al. | |

(Continued)

FOREIGN PATENT DOCUMENTS

JP    10-253447    9/1998

(Continued)

OTHER PUBLICATIONS

"Uncooled infrared Imaging Arrays and Systems", Academic Press, vol. 47, Oct. 8, 1997, p. 84 (cited in [0105], p. 58 of description).

(Continued)

*Primary Examiner* — R. A. Smith
(74) *Attorney, Agent, or Firm* — Renner, Otto, Boisselle & Sklar, LLP

(57) ABSTRACT

An electronic device according to the present invention includes an infrared ray absorbing section 12, which comes to have an increased temperature when irradiated with an incident infrared ray, and at least one heat sensing section 13, of which a physical property varies with the variation in temperature that has been caused due to the heat generated by the infrared ray absorbing section 12. The relative positions of the heat sensing section 13 and the infrared ray absorbing section 12 can be changed so as to switch their states from a first state, in which the infrared ray absorbing section 12 and the heat sensing section 13 are in contact with each other, into a second state, in which the infrared ray absorbing section 12 and the heat sensing section 13 are out of contact with each other, and vice versa.

14 Claims, 14 Drawing Sheets

U.S. PATENT DOCUMENTS

| | | | |
|---|---|---|---|
| 7,193,212 B2 * | 3/2007 | Hirota | 250/338.1 |
| 7,667,202 B2 * | 2/2010 | Cheon et al. | 250/338.4 |
| 7,750,301 B1 * | 7/2010 | Woolaway et al. | 250/339.09 |
| 7,852,491 B2 * | 12/2010 | Webster | 356/519 |
| 2004/0129882 A1 | 7/2004 | Mashio et al. | |
| 2005/0068128 A1 | 3/2005 | Yip | |
| 2005/0133721 A1 | 6/2005 | Kim et al. | |
| 2008/0179525 A1 | 7/2008 | Ikushima et al. | |

FOREIGN PATENT DOCUMENTS

| | | |
|---|---|---|
| JP | 2000-146686 | 5/2000 |
| JP | 2000-295528 | 10/2000 |
| JP | 2003-106896 | 4/2003 |
| JP | 2004-85331 | 3/2004 |
| JP | 2004-125794 | 4/2004 |
| JP | 2005-11795 | 1/2005 |
| JP | 2005-181308 | 7/2005 |

OTHER PUBLICATIONS

Form PCT/ISA/237 for corresponding Application No PCT/JP2007/069392 mailed Jan. 8, 2008, with partial English Translation, date unknown.

International Search Report for corresponding Application No. PCT/JP2007/069392 mailed Jan. 8, 2008.

* cited by examiner (a)

(b)

(a)

(b)

(a)

READ CIRCUIT (b)

ELECTRONIC DEVICE

TECHNICAL FIELD

The present invention relates to an electronic device and more particularly relates to a thermal infrared sensor and a thermal infrared image sensor.

BACKGROUND ART

An infrared sensor for detecting an electromagnetic wave (or an infrared ray) with a wavelength of 3 μm to 10 μm has been used as a heat sensing sensor in crime prevention, measuring, remote sensing and various other fields of applications. An infrared image sensor, in which such sensors are arranged as a two-dimensional array, can obtain an even greater amount of information as a thermal image, and has been used extensively in those fields of applications.

Infrared sensors are roughly classified into quantum sensors and thermal sensors. A quantum sensor is a sensor that is made of compound semiconductors and that operates by utilizing the band-to-band transition. Such a quantum sensor has higher sensitivity and higher response speed than a thermal sensor but operates at relatively low temperatures, thus requiring a cooling mechanism to maintain such low temperatures. That is why it is difficult to reduce the size or manufacturing cost of such a quantum sensor and it is not easy to apply it to cars, crime prevention tools and various other consumer electronic products.

On the other hand, a thermal sensor has lower sensitivity than a quantum sensor but needs no cooling mechanism to maintain low temperatures. For that reason, it is relatively easy to reduce the size and price of such a sensor, and therefore, it has been used extensively in various consumer electronic products. The thermal sensors include thermopile types, bolometer types and pyroelectric types.

A thermopile type includes a portion in which a lot of thermocouples are connected in series together as a thermal sensing portion. A bolometer type includes a resistor that is made of a material, of which the electrical resistance has significant temperature dependence. By detecting a variation in the amount of current flowing through that resistor, the bolometer type sensor can measure the temperature. Meanwhile, a pyroelectric type detects charge to be produced on the surface of a tourmaline crystal, for example, as the temperature varies, thereby sensing the temperature variation.

A thermal sensor of any of these types has a heat insulation structure to prevent the heat from escaping from its infrared sensing portion, thereby maintaining the sensitivity of the sensor reasonably high. An exemplary heat insulation structure for such an infrared sensor is disclosed in Patent Document No. 1, for example.

Hereinafter, the structure of a thermal infrared sensor as disclosed in Patent Document No. 1 will be described with reference to FIG. 8, in which FIG. 8(a) is a plan view illustrating main portions of this infrared sensor and FIG. 8(b) is a cross-sectional view of the sensor as viewed on the plane 8b-8b.

The infrared sensor shown in FIG. 8 includes a substrate 240 of silicon, for example, and a photosensitive section 241 that is supported on the substrate 240. The photosensitive section 241 includes a bolometer 242, of which the electrical resistance has temperature dependence, and an interconnect 243 for measuring the electrical resistance of the bolometer 242. And the photosensitive section 241 functions as a heat sensing section for the infrared sensor. The interconnect 243 may be made of a metal such as aluminum.

On the upper surface of the substrate 240 that is opposed to the bolometer 242, a recess has been cut so as to leave a gap between the photosensitive section 241 and the substrate 240. Such a recess may be formed by selectively removing a predetermined region of the substrate 240 by either a wet etching process or a dry etching process.

The photosensitive section 241 contacts with the substrate 240 at contact portions 245. Both ends 244 of the interconnect 243 run over the contact portions 245 and are connected to a read circuit (not shown).

Hereinafter, it will be described how the infrared sensor shown in FIG. 8 operates.

When the photosensitive section 241 absorbs an infrared ray, the temperature at the bolometer 242 rises. As a result of the rise in temperature, the resistance of the bolometer 242 changes. In such a state, current is supplied to the bolometer 242 through the interconnect 243 and a variation in voltage, caused by the change of resistance, is detected. And based on the magnitude of this voltage variation, the energy of the infrared ray that has been incident on the photosensitive section 241 can be calculated.

The photosensitive section 241 preferably has a structure that can prevent the thermal energy, produced upon the exposure to the infrared ray, from escaping to the outside. In the example illustrated in FIG. 8, the area of contact between the body of the photosensitive section 241 and the substrate 240 is minimized to increase the heat insulation property. Also, the portions including both ends 244 of the interconnect 243 are elongated portions extending from the body of the photosensitive section 241 to reduce the conduction of the heat to the substrate 240. Thus, according to the method of Patent Document No. 1, by shaping the connecting portions between the photosensitive section 241 and the substrate 240 as elongate as possible, the heat insulation property between the photosensitive section 241 and the substrate 240 is improved. As a result, the magnitude of the variation in the temperature of the photosensitive section responsive to an incident infrared ray increases, thus increasing the amplitude of the signal to detect the infrared ray.

Another heat insulation structure for an infrared sensor is disclosed in Patent Document No. 2.

Hereinafter, the structure of the thermal infrared sensor disclosed in Patent Document No. 2 will be described with reference to FIG. 9.

The infrared sensor shown in FIG. 9 includes a lower substrate 110, an upper substrate (photosensitive section) 120, posts 210, lower electrodes 220, a reflective layer 230, and signal legs 200. A bolometer (not shown) is provided for the upper substrate 120.

When the upper substrate 120 absorbs an infrared ray, its bolometer comes to have an increased temperature and a varied resistance value. At this point in time, current is supplied to the bolometer 82 by way of the signal legs 200 with a metallic layer, thereby sensing a variation in voltage that has been caused due to the variation in resistance. And based on the magnitude of this voltage variation, the energy of the infrared ray that has been incident on the upper substrate 120 can be calculated.

The posts 210 are made of an insulator and perform the function of supporting the upper substrate 120 on the lower substrate 110. A cavity or a gap is left between the lower and upper substrates 110 and 120, thereby thermally insulating them from each other. The lower electrodes 220 produce electrostatic force with respect to the signal legs 200, thereby changing the positions of the signal legs 200. In this manner, the signal legs 200 and the upper substrate 120 can alternately have an in-contact state and an out-of-contact state.

When the signal legs 200 and the upper substrate 120 are out of contact with each other, the upper and lower substrates 120 and 110 are connected together with just the posts 210 that are made of an insulator. As a result, the heat insulation property between the upper and lower substrates 120 and 110 improves. Consequently, the rise in the temperature of the upper substrate 120 responsive to the incident infrared ray can be increased. By bringing the signal legs 200 and the upper substrate 120 into contact with each other after they have been out of contact with each other for a certain period of time, current is supplied to the bolometer and the quantity of the infrared radiation that has been incident on the upper substrate 120 is detected.

In such an infrared sensor, the magnitude of variation in the temperature of the photosensitive section responsive to the incident infrared ray increases, and therefore, the magnitude of variation in the resistance of the bolometer (i.e., the level of the signal to detect the infrared ray) can be increased, too.

As can be seen, an infrared sensor is required to have an increased magnitude of variation in temperature in response to an incident infrared ray, and eventually exhibit higher infrared sensitivity, by improving its heat insulation property.

Patent Document No. 1: Japanese Patent Application Laid-Open Publication No. 2003-106896
Patent Document No. 2: Japanese Patent Application Laid-Open Publication No. 2005-181308
Patent Document No. 3: Japanese Patent Application Laid-Open Publication No. 2005-11795

DISCLOSURE OF INVENTION

Problems to be Solved by the Invention

As described above, in the prior art, by either shaping the connecting portions between the photosensitive section and the substrate as elongate as possible or bringing the connecting portions between the photosensitive section and the substrate into, and out of, contact with each other alternately, the heat insulation property is improved between the photosensitive section and the substrate. In this manner, the magnitude of variation in the temperature of the photosensitive section responsive to the incident infrared ray is increased and the level of the signal to detect the infrared ray is also increased.

However, even if the heat insulation property is improved by shaping the connecting portions between the photosensitive section and the substrate as elongate as possible, interconnect, which is made of a metallic material with high thermal conductivity, is still present in the connecting portions between the photosensitive section and the substrate. That is why to further improve the heat insulation property, the interconnect needs to have a further reduced width. Nevertheless, the thinner the interconnect, the higher the electrical resistance of the interconnect. As a result, thermal noise to be caused by the electrical resistance increases and the SNR decreases when the infrared ray is detected.

Furthermore, if the connecting portions were too elongate, then the rigidity thereof would not be high enough to support the photosensitive section, and the sensor might collapse.

In view of these considerations, the method of improving the heat insulation property by shaping the connecting portions between the photosensitive section and the substrate as elongate as possible cannot increase the SNR beyond a certain limit in detecting an infrared ray.

Also, even if the heat insulation property between the photosensitive section and the substrate were improved by alternately bringing the photosensitive section and the substrate into, and out of, contact with each other, the connecting portions would have increased electrical resistance and would generate bigger thermal noise. On top of that, since the resistance value varies in the connecting portions that often change between the in-contact and out-of-contact states, noise may also be produced in the electrical signal. For these reasons, the SNR cannot be increased sufficiently while the infrared ray is detected.

A method for reducing contact resistance in a normal electronic device is disclosed in Patent Document No. 3, for example. In that case, the contact pressure should be increased, for example. According to such a method, however, if the contact pressure were increased excessively, then mechanical breakdown might occur, and the noise could not be reduced sufficiently.

In order to overcome the problems described above, the present invention has an object of providing an electronic device that achieves high heat insulation property and reduced noise (i.e., a high SNR).

Means for Solving the Problems

An electronic device according to the present invention includes: at least one infrared ray absorbing section, which comes to have an increased temperature when irradiated with an incident infrared ray; at least one heat sensing section, of which a physical property varies with the variation in temperature; a detector circuit section for sensing the variation in the physical property of the heat sensing section; and a driving section, which is able to change the states of the infrared ray absorbing section and the heat sensing section from a first state, in which the absorbing and sensing sections are in contact with each other, into a second state, in which these two sections are out of contact with each other, and vice versa.

In one preferred embodiment, the infrared ray absorbing section overlaps the heat sensing section.

In another preferred embodiment, the electronic device includes a substrate with the detector circuit section, and the infrared ray absorbing section is supported on the substrate with an absorbing section supporting member, which is made of either an insulator or a semiconductor.

In an alternative preferred embodiment, the infrared ray absorbing section is supported on the heat sensing section with an absorbing section supporting member, which is made of either an insulator or a semiconductor.

In still another preferred embodiment, the heat sensing section and the detector circuit section are electrically connected together, but the infrared ray absorbing section and the detector circuit section are not connected together with an interconnect.

In yet another preferred embodiment, the infrared ray absorbing section includes a plurality of upper electrodes that store electrical charge. The heat sensing section includes a plurality of lower electrodes that store electrical charge, of which the polarity is opposite to that of the electrical charge in the upper electrode. The lower electrodes face the upper electrodes. And the upper electrodes are electrically connected together.

In yet another preferred embodiment, at least one of the infrared ray absorbing section and the heat sensing section has a thermal contact portion that protrudes toward the other section.

In this particular preferred embodiment, the driving section changes the first and second states by either deforming or shifting at least a part of the thermal contact portion.

In yet another preferred embodiment, the driving section changes the first and second states by either deforming or shifting at least a part of the heat sensing section and the infrared ray absorbing section.

In yet another preferred embodiment, the detector circuit section detects the quantity of the infrared ray by sensing the variation in the physical property.

An electronic device controlling method according to the present invention is a method for controlling an electronic device that includes: an infrared ray absorbing section, which comes to have an increased temperature when irradiated with an incident infrared ray; at least one heat sensing section, of which a physical property varies with the variation in temperature; a detector circuit section for sensing the variation in the physical property of the heat sensing section; and a driving section, which is able to change the states of the infrared ray absorbing section and the heat sensing section from a first state, in which the absorbing and sensing sections are in contact with each other, into a second state, in which these two sections are out of contact with each other, and vice versa. The method includes the steps of: irradiating the infrared ray absorbing section with the infrared ray; and measuring the temperature of the heat sensing section in the first state in which the infrared ray absorbing section and the heat sensing section are in contact with each other.

In one preferred embodiment, the step of irradiating the infrared ray absorbing section with the infrared ray is performed in the second state in which the infrared ray absorbing section and the heat sensing section are out of contact with each other.

In another preferred embodiment, the method includes the step of letting go at least part of heat in the first state after the step of measuring the temperature of the heat sensing section has been performed in the first state in which the infrared ray absorbing section and the heat sensing section are in contact with each other.

In still another preferred embodiment, the step of irradiating the infrared ray absorbing section with the infrared ray is performed in a selected one of the first and second states in which the infrared ray absorbing section and heat sensing section are either in contact with each other or out of contact with each other.

EFFECTS OF THE INVENTION

In the electronic device of the present invention, heat continues to be stored mostly in the infrared ray absorbing section with the heat sensing section and the infrared ray absorbing section spatially separated from each other except during reading. That is why the escape of the heat from the heat storage portion to the outside can be minimized. Besides, since the interconnect that connects together the heat sensing section and the detector circuit section can be kept connected, no noise will be produced by repeatedly turning the interconnect from in-contact state into out-of-contact state, or vice versa. Thus, according to the present invention, the heat insulation property can be improved between the heat storage section and the outside, and therefore, the temperature changes significantly depending on the quantity of the incident infrared radiation. In addition, since the noise produced by the contact resistance is just a negligible level, the infrared ray can be detected with SNR and accuracy both increased.

DESCRIPTION OF REFERENCE NUMERALS

Figure 1:
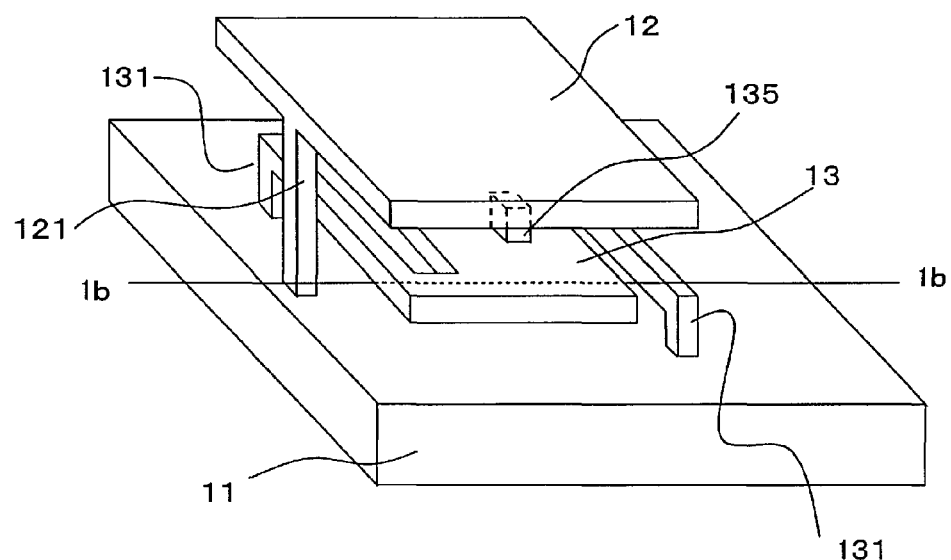
FIG. 1(a) is a perspective view illustrating a preferred embodiment of an electronic device according to the present invention and FIG. 1(b) is a cross-sectional view of the device as viewed on the plane 1b-1b shown in FIG. 1(a).
Figure 1:
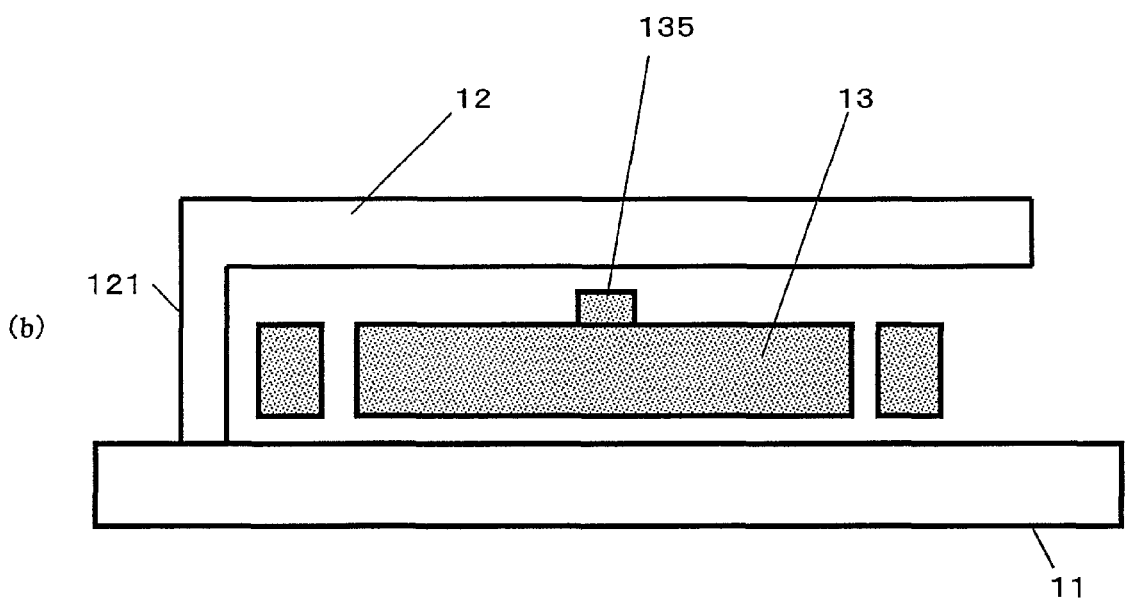

11 substrate portion
12 infrared ray absorbing section
13 heat sensing section
60 electrical switch section
61 power supply section 62 first capacitor
63 second capacitor
121 absorbing section supporting member
124 interconnect section
125 heat absorbing section
131 heat sensing section supporting member
132 bolometer
133 bolometer protective coating
134a interconnect section
135 thermal contact portion
135a first thermal contact portion
135b second thermal contact portion
136 first static induction lower electrode
137 second static induction lower electrode
138 first contact portion
139 second contact portion
121 absorbing section supporting member
122 first static induction upper electrode
123 second static induction upper electrode

BEST MODE FOR CARRYING OUT THE INVENTION

Embodiment 1

Hereinafter, a First Preferred Embodiment of an electronic device according to the present invention will be described with reference to the accompanying drawings. The electronic device of this preferred embodiment is an infrared sensor of a resistance changing type. However, the present invention is in no way limited to this specific preferred embodiment but is also applicable to a pyroelectric infrared sensor, a thermopile type infrared sensor, a dielectric bolometer type infrared sensor, or any other type of electronic device.

In this description, a section of an infrared sensor, of which a physical property changes with a variation in temperature and in which the quantity of the incident infrared radiation is detected based on that change will be referred to herein as an "infrared ray detecting section". In an infrared sensor of the resistance changing type, for example, a bolometer made of a resistance changing material is the infrared ray detecting section. Meanwhile, a "heat sensing section" according to the present invention is a member that includes such an infrared ray detecting section and that will shift and deform along with the infrared ray detecting section. As used herein, the "physical properties" typically include electrical resistance, electrical charge, electrical current value, voltage value and dielectric constant.

First of all, the general configuration of the electronic device of this preferred embodiment will be described with reference to FIGS. 1(a) and 1(b). Specifically, FIG. 1(a) is a perspective view illustrating this preferred embodiment and FIG. 1(b) is a cross-sectional view as viewed on the plane 1b-1b shown in FIG. 1(a) that intersects with the surface of the substrate portion 11 at right angles.

As shown in FIG. 1(a), the electronic device of this preferred embodiment includes a substrate portion 11, and an infrared ray absorbing section 12 and a heat sensing section 13, which are supported on the upper surface of the substrate portion 11.

The substrate portion 11 may be a semiconductor substrate on which an integrated circuit has been formed, for example, and includes a detector circuit section (not shown), which senses a variation in a physical property (e.g., a variation in electrical resistance) of the infrared ray detecting section in the heat sensing section 13. The infrared ray absorbing section 12 is connected to an absorbing section supporting member 121 that supports the entire infrared ray absorbing section 12. The absorbing section supporting member 121 has one end that is always in contact with the substrate portion 11, thereby fixing the infrared ray absorbing section 12 onto the substrate portion 11. Part or all of the infrared ray absorbing section 12 has elasticity that makes it deformable. Thus, the infrared ray absorbing section 12 can change its positions and angles with respect to the substrate portion 11. The heat sensing section 13 is arranged between the infrared ray absorbing section 12 and the substrate portion 11 and is overlapped by the infrared ray absorbing section 12. On one surface of the heat sensing section 13, a thermal contact portion 135 is arranged so as to face and protrude toward the infrared ray absorbing section 12.

The detailed internal structures of the infrared ray absorbing section 12 and heat sensing section 13 will be described later.

Figure 2:
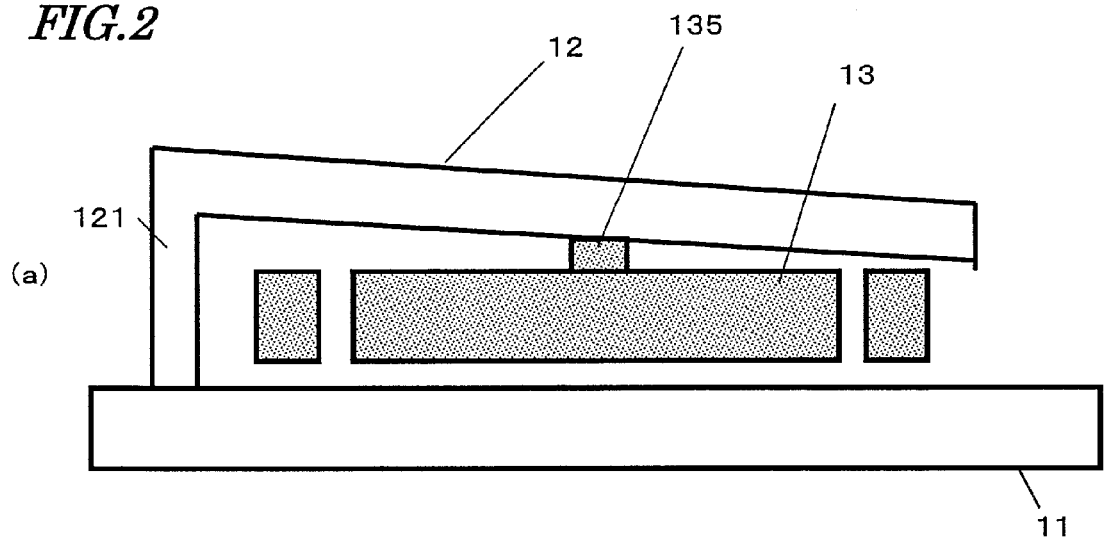
FIGS. 2(a) and 2(b) illustrate how the infrared ray absorbing section operates in the first preferred embodiment of the present invention.
Figure 2:
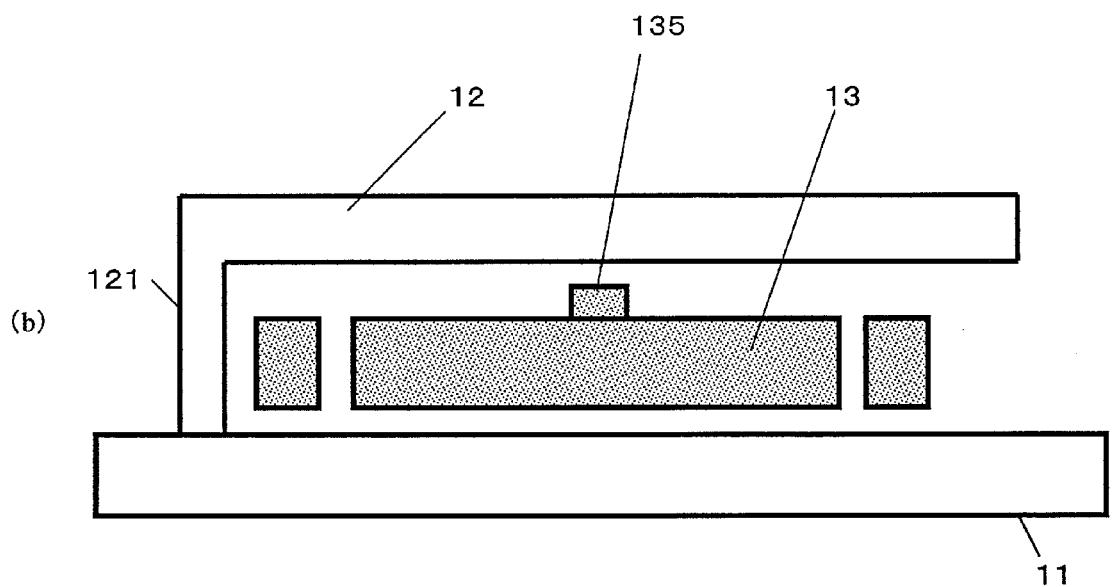

In the electronic device of this preferred embodiment, the top of the thermal contact portion 135 and a portion of the lower surface of the infrared ray absorbing section 12 repeatedly make state transitions between "in-contact" and "out-of-contact" states. Such state transitions of the infrared ray absorbing section 12 and the heat sensing section 12 between the "in-contact" and "out-of-contact" states are realized by electrostatic force, for example. Specifically, electrical charge is produced in the infrared ray absorbing section 12 by electrostatic induction, and the absorbing section supporting member 121 and the infrared ray absorbing section 12 are deformed either partially or entirely by using electrostatic force applied to the electrical charge, thereby making such state transitions between the in-contact and out-of-contact states. During the deformation, the infrared ray absorbing section 12 is secured to the substrate portion 11 with the absorbing section supporting member 121, and therefore, works like a cantilever. In other words, the free end of the infrared ray absorbing section 12 tilts around the fixed end thereof as an axis of rotation. FIGS. 2(a) and 2(b) schematically illustrate the in-contact state and the out-of-contact state, respectively. In the example illustrated in FIG. 2, only the infrared ray absorbing section 12 is supposed to change its positions. Alternatively, a configuration in which the absorbing section supporting member 121 is deformed to change the positions of the absorbing section supporting member 121 and the infrared ray absorbing section 12 may also be adopted. Also, any portion of the absorbing section supporting member 121 or the infrared ray absorbing section 12 could be deformed. Furthermore, a configuration in which any portion of the heat sensing section 13 or a heat sensing section supporting member 131 is deformed could be adopted as well as will be described later. The point is to have the infrared ray absorbing section 12 and the heat sensing section 13 make state transitions between the in-contact and out-of-contact states.

Hereinafter, the configurations of the heat sensing section 13 and the infrared ray absorbing section 12 will be described in detail.

Figure 3:
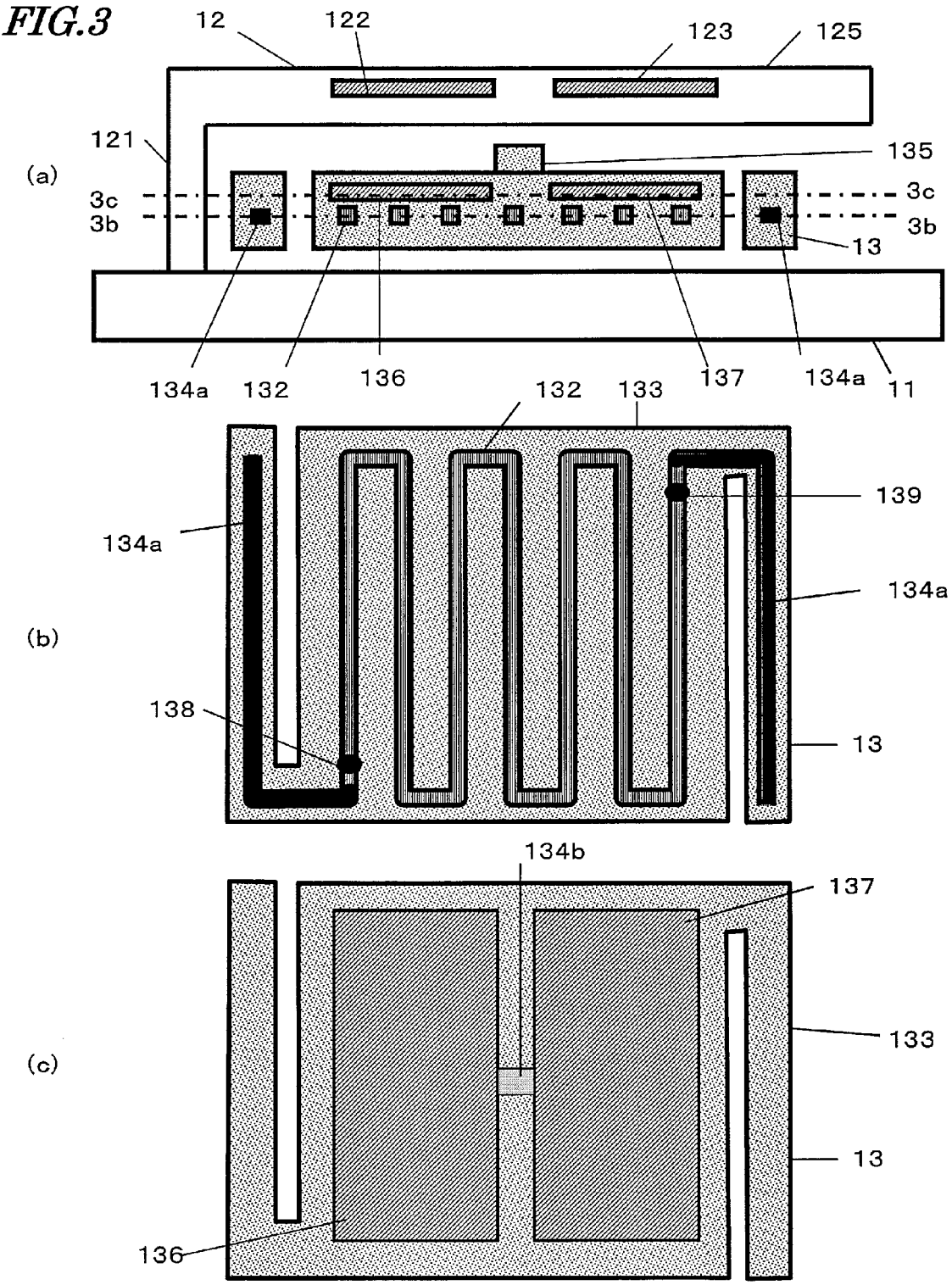
FIG. 3(a) is a cross-sectional view as viewed on the same plane as FIG. 1(b), and FIGS. 3(b) and 3(c) are cross-sectional views as viewed on the planes 3b-3b and 3c-3c, respectively, shown in FIG. 3(a).

First, the configuration of the heat sensing section 13 will be described in detail with reference to FIGS. 3(a) through 3(c). Specifically, FIG. 3(a) is a cross-sectional view as viewed on the same plane as FIG. 1(b) and illustrates the configuration of the heat sensing section 13 in detail. FIGS. 3(b) and 3(c) are cross-sectional views as viewed on the planes 3b-3b and 3c-3c, respectively, shown in FIG. 3(a).

The heat sensing section 13 includes a bolometer 132, a bolometer protective coating 133, interconnect portions 134a, the thermal contact portion 135, a first static induction lower electrode 136, a second static induction lower electrode 137, a first contact portion 138 and a second contact portion 139. The heat sensing section 13 is secured to the substrate portion 11 with the heat sensing section supporting member 131 shown in FIG. 1(a).

FIG. 3(b) illustrates the planar layout of the bolometer 132 in the heat sensing section 13. The bolometer 132 is made of a material, of which the resistivity has heavy temperature dependence such as polysilicon, titanium or vanadium oxide, and has a winding shape. Both ends of the bolometer 132 are connected to the interconnect portions 134a. The bolometer protective coating 133 has the function of protecting the bolometer 132, and is made of an insulating material such as silicon dioxide that covers the bolometer 132.

As the temperature of the heat sensing section 13 changes, the electrical resistance of the bolometer 132 varies. This variation in electrical resistance can be sensed by a read circuit section (detector circuit section, not shown) provided for the substrate portion 11. That is to say, by electrically detecting the variation in the resistance of the bolometer 132 using the read circuit, the magnitude of temperature change of the heat sensing section 13 can be known.

The first static induction lower electrode 136 and the first contact portion 138 are connected to an electrical interconnect 134a. Likewise, the second static induction lower electrode 137 and the second contact portion 139 are connected to another electrical interconnect 134a. The electrical interconnects 134a are connected to the read circuit section of the substrate portion 11 by way of the heat sensing section supporting member 131 shown in FIG. 1(a).

The first and second static induction lower electrodes 136 and 137 of the heat sensing section 13 are connected together with an interconnect portion 134b, and are also connected to the interconnect portions 134a through the first and second contact portions 138 and 139, respectively.

Figure 4:
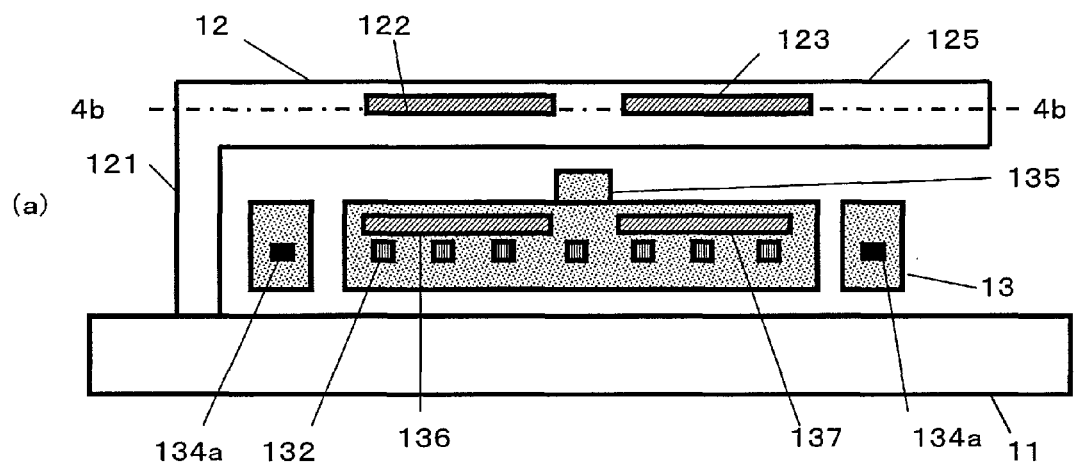
FIG. 4(a) is a cross-sectional view as viewed on the plane 1b-1b shown in FIG. 1(a)
FIG. 4(b) is a cross-sectional view as viewed on the plane 4b-4b shown in FIG. 4(a).
Figure 4:
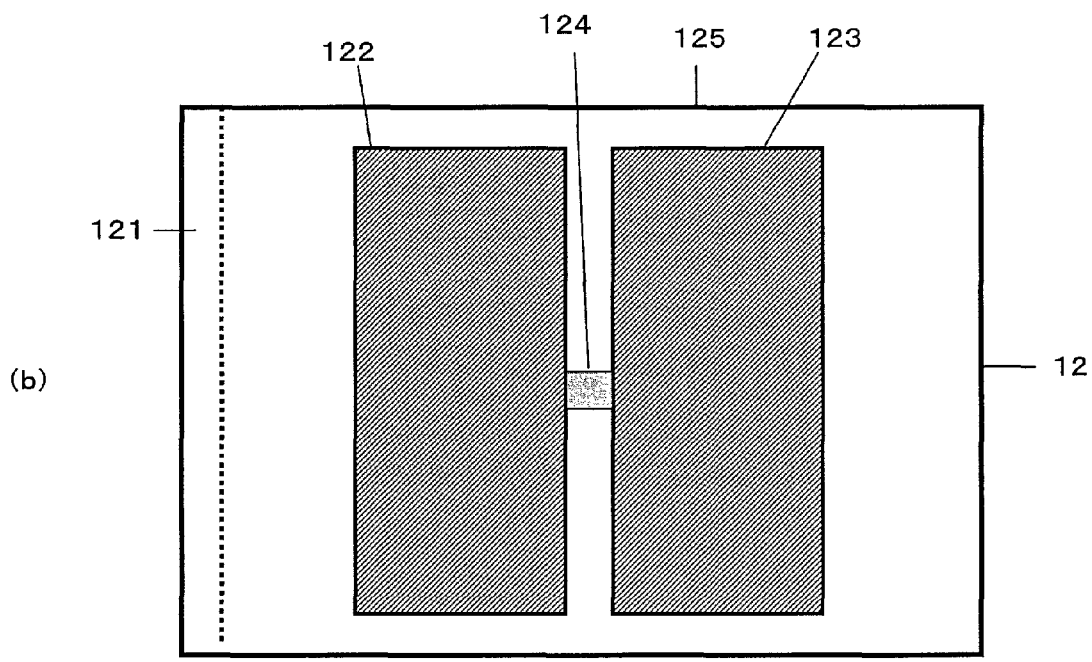

Next, the configuration of the infrared ray absorbing section 12 will be described with reference to FIGS. 4(a) through 4(b). Specifically, FIG. 4(a) is the same cross-sectional view as FIG. 3(a) and FIG. 4(b) is a cross-sectional view as viewed on the plane 4b-4b shown in FIG. 4(a), which is parallel to the substrate portion 11.

The infrared ray absorbing section 12 includes the absorbing section supporting member 121, a first static induction upper electrode 122, a second static induction upper electrode 123, an interconnect portion 124 and a heat absorbing portion 125.

The heat absorbing portion 125 is made of a material such as $SiO_2$ and performs the function of absorbing the incident infrared ray. The first static induction upper electrode 122 is arranged so as to face the first static induction lower electrode 136 of the heat sensing section 13. This first pair of static induction electrodes 122 and 136 forms the first capacitor 62 shown in FIG. 5. On the other hand, the second static induction upper electrode 123 is arranged so as to face the second static induction lower electrode 137 of the heat sensing section 13. This second pair of static induction electrodes 123 and 137 forms the second capacitor 63 shown in FIG. 5.

Figure 5:
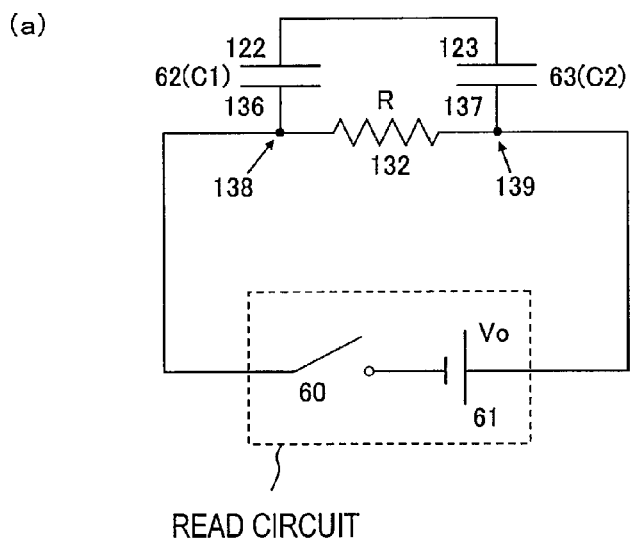
FIG. 5(a) is an equivalent circuit diagram illustrating a cell of the electronic device of the present invention, of which the electrical switch section 60 is in OFF state.
FIG. 5(b) is an equivalent circuit diagram illustrating a cell, of which the electrical switch section 60 is in ON state.
Figure 5:
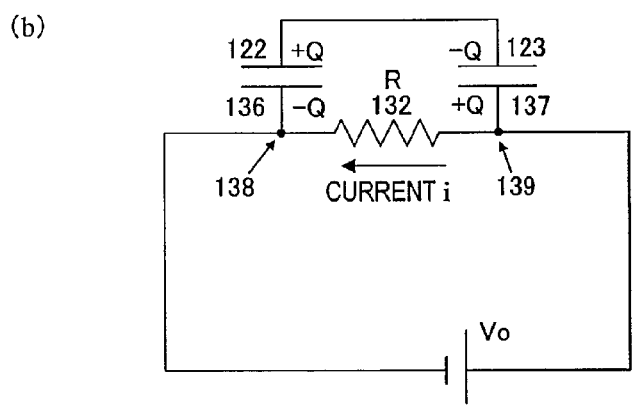

FIG. 5 is an equivalent circuit diagram outlining the configuration of an electric circuit that is formed by the respective components described above. The read circuit includes a power supply section 61 and an electrical switch section 60 that turns ON and OFF to selectively connect or disconnect the power supply section 61 and a bolometer 132 to/from each other. The electrical switch section 60 may be implemented as an MOS transistor, for example. As will be described later, an electronic device can also be designed such that a number of infrared ray absorbing sections and heat sensing sections are arranged on the same substrate portion. For example, using the basic arrangement shown in FIG. 1 including the infrared ray absorbing section and the heat sensing section as a cell, a one- or two-dimensional arrangement (or array) of such cells may be formed on the same substrate portion. In that case, the power supply section may be shared in common by all of those cells but the power supply section and the bolometer can be selectively connected or disconnected on a cell-by-cell basis.

FIG. 5(a) illustrates a state in which the electrical switch section 60 has been turned OFF. In this state, no current flows through the bolometer 132 and no electrical charge is stored yet in the first and second capacitors 62 and 63. That is why no electrostatic force is produced between the infrared ray absorbing section 12 and the heat sensing section 13. As a result, the infrared ray absorbing section 12 and the heat sensing section 13 are in the out-of-contact state.

On the other hand, FIG. 5(b) illustrates a state in which the electrical switch section 60 has been turned ON. In this state, current i is flowing through the bolometer 132 and a voltage V0 is applied between the two terminals of the bolometer 132. As a result, electrical charge Q is stored in the first and second capacitors 62 and 63 as shown in FIG. 5(b). Consequently, electrostatic attraction is produced between the two electrodes of each of these capacitors and the infrared ray absorbing section 12 and the heat sensing section 13 contact with each other. Once contacted with each other, the infrared ray absorbing section 12 and the heat sensing section 13 start to exchange heat with each other. And in a sufficiently short time (of 1 ms to 1 μs, for example), the infrared ray absorbing section 12 and the heat sensing section 13 will have substantially equal temperatures. At that time, the temperatures of the infrared ray absorbing section 12 and the heat sensing section 13 may be higher than room temperature by approximately 1° C. Of this temperature increase of approximately 1° C. from room temperature, a temperature increase of approximately 0.1° C. may be caused by the infrared ray that has come from the subject and the remaining temperature increase of approximately 0.9° C. may be caused by Joule heat. In this case, however, the electronic device is supposed to be an infrared camera that includes a sensor chip, in which a number of cells are arranged two-dimensionally on the same substrate portion, and a lens, and the temperature of the subject is supposed to be higher than room temperature by 1° C.

It should be noted that the electrical resistance to be produced nowhere but in the bolometer 132 is taken into consideration for the sake of simplicity. When the electrical switch 60 in the ON state is turned OFF, there will be no electrostatic force between the infrared ray absorbing section 12 and the heat sensing section 13. As a result, the infrared ray absorbing section 12 comes out of contact with the heat sensing section 13 due to the elasticity of the infrared ray absorbing section 12 and the absorbing section supporting member 121.

As described above, according to this preferred embodiment, the electrodes 122, 123, 136 and 137 are used as a driving section for making the infrared ray absorbing section 12 and the heat sensing section 13 come into thermal contact, or go out of thermal contact, with each other.

The bolometer 132 has such a property as to have its resistance varied with the temperature. Thus, by measuring the amount of the current i flowing through the bolometer 132 or detecting its variation with time while the electrical switch section 60 is in ON state, the temperature or the temperature variation of the bolometer 132 can be detected. As described above, in a situation where the infrared ray absorbing section 12 and the heat sensing section 13 are in contact with each other, the temperatures of these two sections 12 and 13 will become approximately equal to each other very soon. That is why by sensing the temperature of the bolometer 132 in such a state, the quantity of the infrared ray that has been absorbed into the infrared ray absorbing section 12 can be calculated.

Hereinafter, a method for calculating the quantity of the infrared radiation that has been absorbed into the infrared ray absorbing section 12 based on the temperature of the bolometer 132 will be described briefly.

Suppose the heat capacities of the infrared ray absorbing section 12 and the heat sensing section 13 are represented by Y1 and Y2, respectively. Also, suppose the temperatures of the bolometer 132 when no infrared radiation is incident and when an infrared ray is incident are represented by T0 and T1, respectively. And suppose the quantity of heat generated when the infrared ray absorbing section 12 absorbs the infrared radiation is N0, the quantity of heat escaping from the infrared ray absorbing section 12 into anywhere but the heat sensing section 13 is N1, and the quantity of heat escaping from the heat sensing section 13 into anywhere but the infrared ray absorbing section 12 is N2. In that case, considering how much heat should be exchanged between a system as a combination of the infrared ray absorbing section 12 and the heat sensing section 13 and the outside, the following equation is satisfied:

$$N0-N1-N2=(Y1+Y2)\times(T1-T0)$$

In this example, the heat quantity N1 can be calculated based on thermal conductance between the infrared ray absorbing section 12 and anywhere but the heat sensing section 13, while the heat quantity N2 can be calculated based on thermal conductance between the heat sensing section 13 and anywhere but the infrared ray absorbing section 12. It should be noted that the Joule heat generated by electrical current is ignored for the sake of simplicity.

Optionally, the quantity of the incident infrared radiation can be detected even more accurately with the quantity of heat that has not been absorbed into the infrared ray absorbing section but has been directly incident on the heat sensing section taken into account, too.

In this preferred embodiment, the absorbing section supporting member 121 is made of a heat insulator with low thermal conductivity, and therefore, the heat quantity N1 can be smaller than that of a conventional infrared sensor. Also, by shortening the read time, the heat quantity N2 can be smaller than its corresponding heat quantity of a conventional infrared sensor. For example, the magnitudes of the heat quantities N1 and N2 can be reduced to approximately 1/10 of conventional ones. As a result, although the increase in the temperature of the heat sensing section responsive to the incident infrared ray may be approximately 0.01° C., for example, in the conventional infrared sensor, the increase in temperature can be approximately 0.1° C. according to the present invention. It should be noted that this temperature increase is calculated on the supposition that the electronic device of the present invention is an infrared camera including a sensor chip, in which a number of cells are arranged two-dimensionally on the same substrate portion, and a lens and that the subject's temperature is higher than room temperature by 1° C. Also, the Joule heat is ignored.

For these reasons, the temperature variation (T1-T0) of the bolometer 132 of this preferred embodiment is greater than a corresponding one of the prior art. As a result, the infrared sensor of this preferred embodiment has higher sensitivity than the conventional one.

In the circuit configuration shown in FIG. 5, the same interconnect is used in order to detect a variation in resistance by supplying current to the bolometer 132 and to apply a voltage to the first and second static induction lower electrodes 136 and 137. That is why compared to a situation where two different interconnects are used for these two purposes, the thermal conductance through the interconnect can be reduced. As a result, the heat insulation property of the heat sensing section 13 and the infrared responsivity can be both improved. Furthermore, since there is no interconnect between the infrared ray absorbing section 12 and the heat sensing section 13 and between the infrared ray absorbing section 12 and the substrate portion 11, the heat insulation property and the infrared responsivity can be improved between the infrared ray absorbing section 12 and the heat sensing section 13 and between the infrared ray absorbing section 12 and the substrate portion 11

In this preferred embodiment, to switch the infrared ray absorbing section 12 and the heat sensing section 13 alternately between the in-contact state and the out-of-contact state, the infrared ray absorbing section 12 is partially deformed, and the relative positions of respective portions of the infrared ray absorbing section 12 and the heat sensing section 13 are changed, by the driving section. However, the present invention is in no way limited to that specific preferred embodiment. Alternatively, the driving section may deform either the infrared ray absorbing section 12 entirely or part or all of the heat sensing section 13. Still alternatively, both the infrared ray absorbing section 12 and the heat sensing section 13 may be deformed either entirely or just partially. In any case, the point is that the infrared ray absorbing section 12 and the heat sensing section 13 should make state transitions a number of times between the in-contact and out-of-contact states.

In this preferred embodiment, the absorbing section supporting member 121 is made of an insulator with high heat insulation property (such as $SiO_2$). Aluminum, which is normally used as an interconnect material, has a thermal conductivity of approximately 1.32 W/cm·K. Meanwhile, $SiO_2$ (silicon dioxide) has a thermal conductivity of approximately 0.014 W/cm·K. That is why when the infrared ray absorbing section 12 and the heat sensing section 13 are in the out-of-contact state, the degree of heat insulation achieved between the infrared ray absorbing section 121 and the other portions is very high. Consequently, if the quantity of the incident infrared radiation changes, the temperature of the infrared ray absorbing section 12 will change more significantly than the conventional one. Optionally, to further increase the degree of heat insulation between the infrared ray absorbing section 121 and the other portions, the inside of the cavity may have either a reduced pressure (of 50 mTorr or less, for example) or a vacuum.

In the illustrated example, the absorbing section supporting member 121 is shaped so as to extend straight perpendicularly to the surface of the substrate portion 11. Alternatively, to improve the heat insulation property between the infrared ray absorbing section 12 and the substrate portion 11, a portion of the absorbing section supporting member 121 may have a winding shape.

As described above, in this preferred embodiment, the infrared ray absorbing section 12 is not always out-of-contact with the heat sensing section 13. But when the heat sensing section 13 needs to sense a variation in a physical property of a portion functioning as the infrared ray absorbing section, the infrared ray absorbing section 12 and the heat sensing section 13 are brought into contact with each other. As a result of this contact, the infrared ray absorbing section 12 and the heat sensing section 13 thermally contact with each other.

The thermal contact portion 135 may have a height of approximately 1 μm and a cross section of 100 μm$^2$, for example, and may be made of a metal such as aluminum. And the thermal contact portion 135 has great thermal conductance between its two terminals. That is why when brought into contact with each other, the infrared ray absorbing section 12 and the heat sensing section 13 will have substantially the same temperature very shortly. By making the detector circuit section detect the temperature of the heat sensing section 13 in such a state, the quantity of the incident infrared radiation or a variation in that quantity can be detected.

In this preferred embodiment, the infrared ray absorbing section 12 and the heat sensing section 13 make state transitions between the in-contact and out-of-contact states. Thus, a state where the infrared ray absorbing section 12 and the heat sensing section 13 are in thermal contact with each other and a state where these two sections 12 and 13 are out of thermal contact with each other can alternate a number of times. That is to say, by changing the relative positions of the infrared ray absorbing section 12 and the heat sensing section 13, the infrared ray absorbing section 12 and the heat sensing section 13 form a "thermal switch" so to speak. A similar but different type of switch to be formed by changing the relative positions of two objects is an "electrical switch" that electrically connects two objects together when they go into contact with each other and that electrically disconnects them when they come out of contact with each other. In an electronic device with such an electrical switch, the electrical resistance of that contact portion normally causes noise. That is why when such an electronic device is used as a sensor, its sensitivity will decrease. In this preferred embodiment, however, the switch formed by the infrared ray absorbing section 12 and the heat sensing section 13 is not an electrical switch, and therefore, has nothing to do with such noise that would be caused by the electrical resistance of the contact portion.

In this preferred embodiment, the temperature of the heat sensing section 13 is detected by the detector circuit section while the infrared ray absorbing section 12 and the heat sensing section 13 are in contact with each other. However, the present invention is in no way limited to that specific preferred embodiment. Alternatively, after having kept contact with each other for a while, the infrared ray absorbing section 12 and the heat sensing section 13 may come temporarily out of contact with each other and the temperature of the heat sensing section 13 may be detected by the detector circuit section in that state. Still alternatively, when a predetermined amount of time passes since the infrared ray absorbing section 12 and the heat sensing section 13 were brought into contact with each other, the temperature of the heat sensing section 13 may be detected by the detector circuit section.

The heat sensing section 13 is illustrated in FIG. 1 in a simplified form as if it were just a flat plate. But the heat sensing section 13 actually has a bolometer functioning as an infrared ray detecting element as will be described in detail later.

The heat sensing section 13 is preferably shaped so as to have planar dimensions that fall within a rectangular range of several millimeters square, and may have a rectangular shape of 30 μm square. The heat sensing section 13 may have a thickness of 1 mm or less and is set to be about 2 μm in this preferred embodiment. To change the positions of the heat sensing section 13 quickly with a sort of non-contact force such as electrostatic force, the heat sensing section 13 preferably has a reduced size and a reduced mass. Also, the heat sensing section 13 with a reduced size would have decreased heat capacity, too.

For example, even if a small heat sensing section 13 of a thin plate shape with a thickness of 2 μm, a length of 30 μm and a width of 30 μm is used, a sufficient quantity of infrared radiation can be incident on the heat sensing section 13 from above it by using an appropriate lens. While out of contact with each other, the infrared ray absorbing section 12 and the heat sensing section 13 may have a gap falling within the range of 0.5 μm to 5 μm, e.g., approximately 2 μm. With such a gap left, while the infrared ray absorbing section 12 and the heat sensing section 13 are out of contact with each other, a sufficient degree of heat insulation is achieved between the infrared ray absorbing section 12 and the heat sensing section 13. As a result, the infrared responsivity of the device improves.

Figure 6:
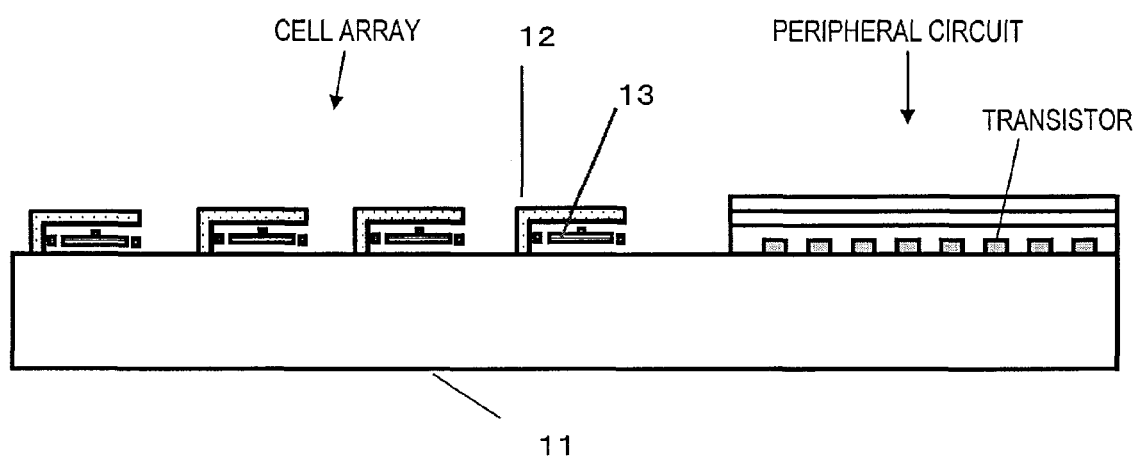
FIG. 6 is a cross-sectional view illustrating, as a preferred embodiment of an electronic device according to the present invention, a cross section of the electronic device in which multiple infrared ray absorbing sections 12 and heat sensing sections 13 are arranged on the same substrate 11.

FIG. 6 schematically illustrates a cross section of an electronic device in which a number of infrared ray absorbing sections 12 and heat sensing sections 13 are arranged on the same substrate portion 11. Specifically, in the example illustrated in FIG. 6, a one- or two-dimensional array of cells (which will be simply referred to herein as a "cell array"), each having the basic configuration shown in FIG. 1, is formed on the same substrate portion 11. Such an array of cells can form an infrared line sensor or an infrared image sensor. On the substrate portion 11, arranged is a peripheral circuit including circuit components such as transistors as its elements. This peripheral circuit further includes a detector circuit section (i.e., a data reading circuit) and a driver for controlling the drive positions of the infrared ray absorbing section 12. The heat sensing section 13 and the peripheral circuit can be electrically connected together by way of electrical interconnects (not shown in FIG. 6) including the interconnect portions 134a shown in FIG. 3.

If the cells are arranged in columns and rows so as to form a matrix pattern, the peripheral circuit reads data on either a row-by-row basis or a column-by-column basis. In reading data on a row-by-row basis, for example, data is sequentially read from the $N^{th}$ row of cells (where N is a natural number) and then from the $(N+1)^{th}$ row of cells in the same way. By repeatedly performing this operation, data can be obtained from the cell array with the two-dimensional arrangement and an infrared image sensor can be provided.

In a preferred embodiment in which such cells are arranged in columns and rows on the same substrate portion 11, if variations in the electrical resistance of the respective bolometers 21 of those cells are detected sequentially by the method described above, the in-plane distribution of the intensities of the infrared rays incident on the respective cells can be detected with high sensitivity. As a result, a high-sensitivity infrared image can be obtained.

In the preferred embodiment described above, the state transitions of the infrared ray absorbing section 12 and the heat sensing section 13 between the in-contact and out-of-contact states are made with electrostatic force produced by electrostatic induction. Alternatively, the electrostatic force produced by electrostatic induction may be replaced with electrostatic force produced between the electrodes of an electret capacitor. Since the electrodes of an electret capacitor store electrical charge inside, electrostatic force can be produced between the electrodes by applying a voltage to the electrodes and producing electrical charge at one of the two electrodes. Still alternatively, the electrostatic force may be replaced with electromagnetic force. For example, if the infrared ray absorbing section 12 includes a ferromagnetic portion and if the heat sensing section 13 has a coil, electromagnetic force can be generated between the ferromagnetic portion and the coil when current flows through the coil. And by changing the relative positions of the infrared ray absorbing section 12 and heat sensing section 13 by using this electromagnetic force, these sections 12 and 13 can also make state transitions between the in-contact and out-of-contact states.

Also, in the preferred embodiment described above, the infrared ray absorbing section 12 is deformed just like a cantilever with one end fixed, and therefore, can operate with good stability. And the position of that deformed portion of the infrared ray absorbing section 12 can be controlled easily. However, the infrared ray absorbing section 12 could also be shaped so as to be totally cut off from the other portions. That is to say, while the infrared ray absorbing section 12 and the heat sensing section 13 are out of contact with each other, the infrared ray absorbing section 12 could be designed so as to be uplifted without contacting with any external portion. In such an arrangement, while the infrared ray absorbing section 12 and the heat sensing section 13 are out-of-contact with each other, the heat insulation property between the infrared ray absorbing section 12 and the other portions can be further improved and the sensitivity can be further increased.

Suppose the infrared ray absorbing section 12 is totally cut off from the other portions. In that case, the position of the infrared ray absorbing section 12 can be detected by arranging a number of electrodes on the surface of the infrared ray absorbing section 12 and a number of counter electrodes that face the former electrodes and by detecting a variation with time in the electrical charge stored in the capacitors formed by those pairs of electrodes that face each other. And if this position information is fed back, the position of the infrared ray absorbing section 12 can be controlled precisely by controlling the magnitude of electrostatic force between the infrared ray absorbing section 12 and the heat sensing section 13. In this manner, the infrared ray absorbing section 12 and the heat sensing section 13 can make state transitions between the in-contact and out-of-contact states.

If the top of the thermal contact portion 135 has an increased area, the infrared ray absorbing section 12 and the heat sensing section 13 can exchange heat even more smoothly and the read time can be shortened. Optionally, if the top of the thermal contact portion 135 is tilted such that the infrared ray absorbing section 12 and the heat sensing section 13 contact with each other more closely, the infrared ray absorbing section 12 and the heat sensing section 13 can exchange heat even more smoothly and the read time can be shortened.

Also, in the preferred embodiment described above, at least a portion of the infrared ray absorbing section 12 is deformed perpendicularly to the surface of the substrate portion 11. However, the infrared ray absorbing section 12 could also be deformed parallel to the surface of the substrate portion 11. In that case, the thermal contact portion 135 preferably protrudes parallel to the surface of the substrate portion 11.

Figure 7:
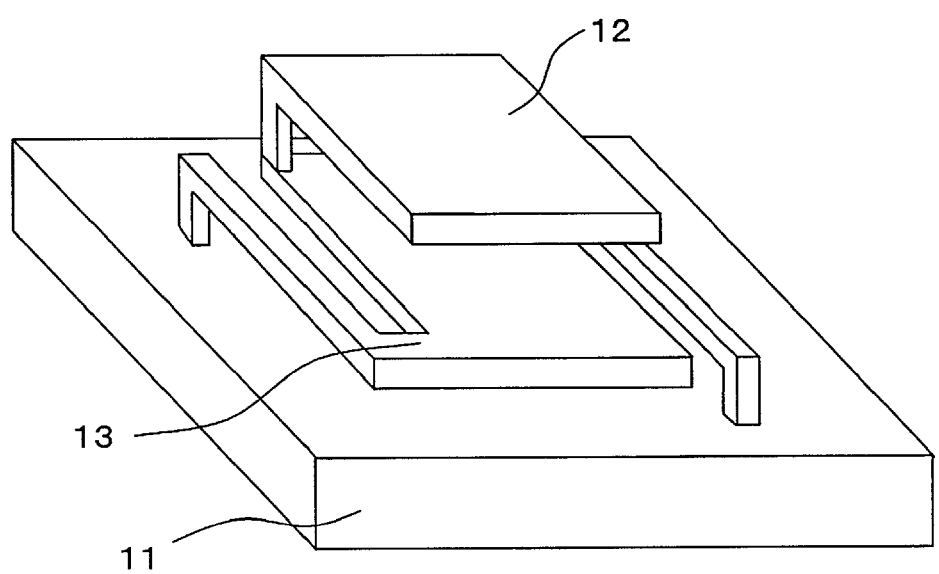
FIG. 7 is a perspective view illustrating another preferred embodiment of an electronic device according to the present invention.
Figure 8:
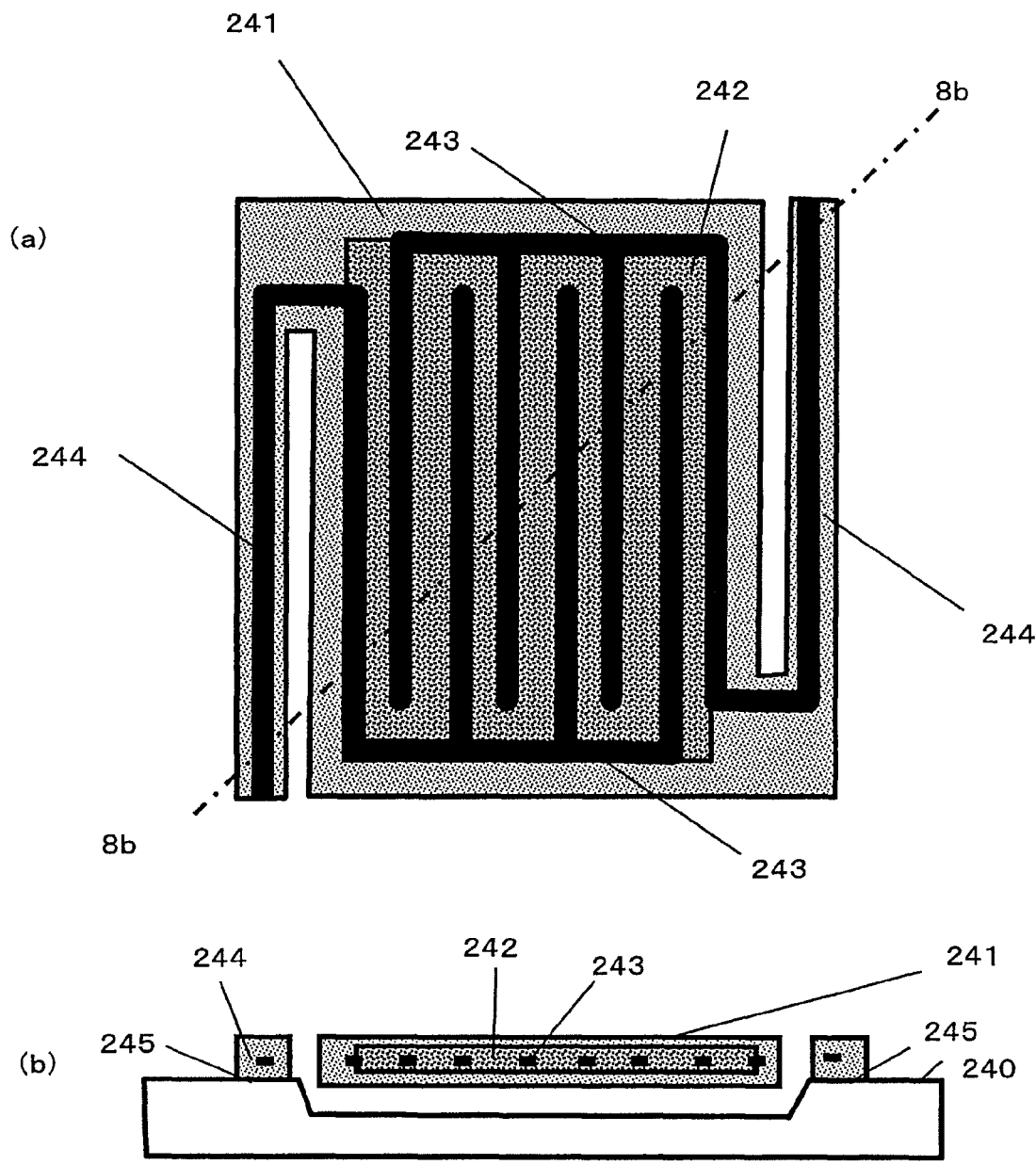
FIG. 8(a) is a plan view illustrating a typical conventional electronic device and FIG. 8(b) is a cross-sectional view of the device as viewed on the plane 8b-8b.
Figure 9:
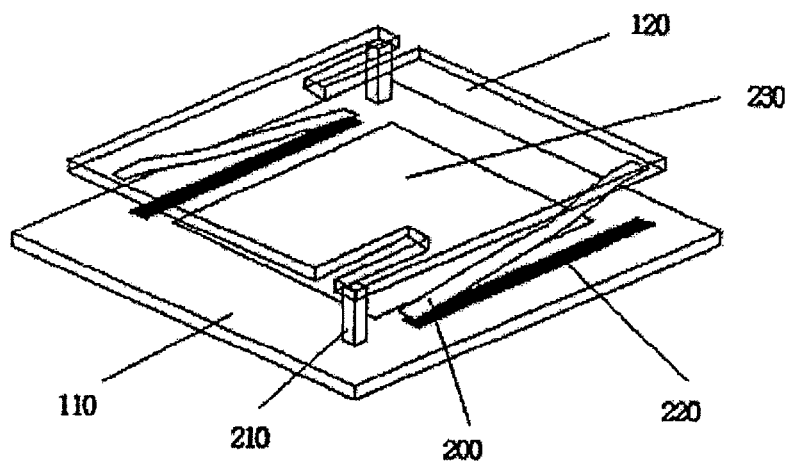
FIG. 9 is a perspective view illustrating another conventional electronic device.

In the preferred embodiment described above, the infrared ray absorbing section 12 and the substrate portion 11 are directly connected together. However, the present invention is in no way limited to that specific preferred embodiment. Alternatively, an arrangement in which the infrared ray absorbing section 12 is supported on the heat sensing section 13 as shown in FIG. 7 may also be adopted. In that case, by either increasing the length of the connecting portion between the infrared ray absorbing section 12 and the heat sensing section 13 or winding the connecting portion, the thermal conductance between the infrared ray absorbing section 12 and the heat sensing section 13 can be decreased.

Furthermore, in the preferred embodiment described above, the positions of the infrared ray absorbing section 12 are changed by providing electrodes for the heat sensing section 13. Alternatively, the positions of the infrared ray absorbing section 12 may also be changed by providing electrodes for the substrate portion 11. Still alternatively, an arrangement in which the infrared ray absorbing section 12 and the heat sensing section 13 make state transitions between the in-contact and out-of-contact states by changing the positions of the heat sensing section 13 may also be adopted.

Optionally, after the temperature of the heat sensing section 13 has been detected by the detector circuit section, the infrared ray absorbing section 12 and the heat sensing section 13 may be kept in contact with each other for a certain amount of time, thereby resetting the temperatures of the infrared ray absorbing section 12 and the heat sensing section 13. In that case, after the temperatures have been reset, the infrared ray absorbing section 12 and the heat sensing section 13 come out of contact with each other and the infrared radiation is absorbed. According to this method, since the temperatures are reset, it is possible to prevent a signal representing the temperature of the heat sensing section 13 that has once been detected by the detector circuit section from affecting a signal representing the temperature of the heat sensing section 13 detected by the detector circuit section next time. As a result, the response time of the infrared sensor can be shortened. Also, if an infrared line sensor or an infrared image sensor is formed by the method described above, afterimages can be reduced in the resultant infrared image. Optionally, a resetting thermal switch may be newly provided between the substrate and the heat sensing section or between the substrate and the infrared ray absorbing section such that a reset operation is performed after the temperature of the heat sensing section 13 has been detected by the detector circuit section. In that case, the thermal conductance of the resetting thermal switch can be greater than the thermal conductance between the infrared ray absorbing section and the substrate or between the heat sensing section and the substrate. As a result, the reset operation can be done more efficiently and more quickly.

Optionally, a reflector may be provided for either the substrate portion 11 or the heat sensing section 13 so as to reflect the infrared ray, which has been transmitted through the infrared ray absorbing section 12, back toward the infrared ray absorbing section 12 again. In that case, the infrared ray absorption rate of the infrared ray absorbing section 12 can be increased and the infrared responsivity can be improved.

Hereinafter, a preferred method for controlling an electronic device according to the present invention will be described.

First of all, the relation between the sensitivity and the response time in a thermal infrared sensor will be described.

In a normal thermal infrared sensor, the smaller the thermal conductance between the heat storage portion and the outside, the higher the sensitivity but the longer the response time. In an infrared sensor as a preferred embodiment of an electronic device according to the present invention, while the infrared ray absorbing section and the heat sensing section are out of contact with each other, heat is stored mostly in the infrared ray absorbing section. Meanwhile, while the infrared ray absorbing section and the heat sensing section are in contact with each other, the heat that has been stored in the infrared ray absorbing section transfers to the heat sensing section, too, and most of the heat is stored in the infrared ray absorbing section and the heat sensing section.

That is why while the infrared ray absorbing section and the heat sensing section are out of contact with each other, the thermal conductance between the heat storage portion and the outside becomes approximately equal to that of the absorbing section supporting member. Meanwhile, while the infrared ray absorbing section and the heat sensing section are in contact with each other, the thermal conductance between the heat storage portion and the outside becomes approximately equal to the sum of the thermal conductance of the heat sensing section supporting member and that of the absorbing section supporting member.

To calculate the thermal conductance between the heat storage portion and the outside even more accurately, the quantity of heat escaping from the heat storage portion by convection or radiation needs to be taken into consideration.

A variation in the temperature of the heat storage portion of a thermal infrared sensor is normally represented by the following differential equation:

$$C \times dT/dt = Q_A - g \times (T - Ts)$$

where C is the heat capacity of the heat storage portion, T is the temperature of the heat storage portion, t is time, dT/dt is the differential value of T with respect to t, $Q_A$ is the quantity of heat absorbed by the heat storage portion per unit time, g is the thermal conductance between the heat storage portion and the outside, and Ts is the external temperature. The influence of Joule heat is ignored for the sake of simplicity.

According to this differential equation, if $Q_A$ is constant, T changes from its initial value exponentially, and its converged value and its time constant τ are equal to Ts+$Q_A$/g and C/g, respectively. In this case, $Q_A$ is supposed to be constant, which corresponds to a situation where an infrared ray radiated from a subject at a fixed position and with a constant temperature needs to be detected with an infrared sensor at a fixed position. Also, g is supposed to be constant for the sake of simplicity. Actually, however, in an infrared sensor according to the present invention, the g value does change because the infrared ray absorbing section and the heat sensing section make states transitions between the in-contact and out-of-contact states. In any case, however, it can be seen that the smaller the g value at any point in time, the greater the converged value of T and the higher the sensitivity of the infrared sensor. It can also be seen that the smaller the g value at any point in time, the greater the time constant τ and the longer it will take to get T converged (i.e., the longer the response time).

As can be seen easily from the foregoing description, in a normal thermal infrared sensor, the smaller the thermal conductance between the heat storage portion and the outside, the higher the sensitivity but the longer the response time (i.e., the slower the responsivity).

In an ordinary infrared sensor, g may have a value of 0.1 μW/K ($10^{-7}$ W/K) and C may have a value of 3 nJ/K ($3 \times 10^{-9}$ J/K). These values are described on page 84 of a book entitled "Uncooled Infrared Imaging Arrays and Systems", Academic Press, Oct. 8, 1997. In that example, however, the pixel size is 50 μm². Also, as the time constant τ is calculated to be 30 msec in that example, the afterimages would rarely be a problem even at the frame rate of 30 fps (corresponding to a time resolution of 33 msec) of a normal digital camcorder. Meanwhile, in the infrared sensor of this preferred embodiment, if the g value while the infrared ray absorbing section and the heat sensing section are out of contact with each other were defined to be smaller than that value, the afterimages would be a non-negligible problem at a frame rate of 30 fps.

Next, it will be described how to reduce the influence of afterimages and shorten the response time in an infrared sensor according to this preferred embodiment.

One way to reduce the influence of the afterimages could be to decrease the heat capacity value C, which may be achieved by reducing the pixel size, for example. In a conventional infrared sensor, to reduce the influence of the afterimages and increase the frame rate, it is effective to decrease the heat capacity value C. As for the infrared sensor of this preferred embodiment, on the other hand, the following method is adopted as another way to reduce the influence of the afterimages and shorten the response time.

Specifically, heat is absorbed while the infrared ray absorbing section and the heat sensing section are out of contact with each other. After that, when the infrared ray absorbing section and the heat sensing section go into contact with each other, the temperature of the heat sensing section is detected, thereby finishing the temperature detection on the heat sensing section. However, even after this temperature detection is finished, the infrared ray absorbing section and the heat sensing section will still be kept in contact with each other for a while. In this manner, part of the heat that has been stored during one frame can escape before the next frame begins. As a result, the influence of the afterimages can be reduced.

As alternative temperature detecting methods, a method of detecting a variation in the resistance of the heat sensing section with current supplied thereto or any other temperature detecting technique that is applicable for use in a thermal infrared sensor may also be used. It should be noted that the time for detecting the temperature of the heat sensing section needs to be at least as long as a certain period of time in order to reduce the noise. Meanwhile, in order to reduce the influence of Joule heat, the time also needs to be at most as long as another predetermined period of time. The time for detecting the temperature of the heat sensing section may be 35 μsec, for example. This is the value adopted in the book cited above.

Other techniques for reducing the influence of the afterimages on the infrared sensor of this preferred embodiment and shortening the response time thereof will be described.

First of all, the frame rates could be changed dynamically by adjusting, on a frame-by-frame basis, the period of time for which the infrared ray absorbing section and the heat sensing section are kept out of contact with each other. Alternatively, the period of time for detecting the temperature of the heat sensing section with the infrared ray absorbing section and the heat sensing section still kept in contact with each other may also be adjusted frame by frame. Still alternatively, the period of time for keeping the infrared ray absorbing section and the heat sensing section in contact with each other after the temperature of the heat sensing section has been detected can also be adjusted frame by frame.

Alternatively, these values may also be changed on a pixel-by-pixel basis. Or these values may even be changed automatically according to the type of the scene to shoot. In the latter case, if the scene to shoot has a lot of motion, the frame rates may be changed by adjusting, for a frame, the period of time for absorbing the heat with the infrared ray absorbing section and the heat sensing section kept out of contact with each other, the period of time for detecting the temperature of the heat sensing section with the infrared ray absorbing section and the heat sensing section still kept in contact with each other, or the period of time for keeping the infrared ray absorbing section and the heat sensing section in contact with each other after the temperature of the heat sensing section has been detected. As a specific example of these methods, if the subject of shooting has been sensed to be moving, for example, the period of time for absorbing the heat with the infrared ray absorbing section and the heat sensing section kept out of contact with each other can be shortened for either a particular pixel or even every pixel. Or the period of time for keeping the infrared ray absorbing section and the heat sensing section in contact with each other after the temperature of the heat sensing section has been detected may be increased for that particular pixel or every pixel. Then the read rate of the target pixel can be increased. In a more particular situation of this specific example, if the subject of shooting has been sensed to be moving, the infrared ray absorbing section and the heat sensing section may always be kept in contact with each other for a certain period of time on either a particular pixel or every pixel and then the absorption of heat and detection of the temperature of the heat sensing section may be carried out by turns in that state, thereby increasing the read rate. As for methods for detecting the motion of the subject of shooting, a known method such as block matching or a gradient method may be adopted.

Figure 10:
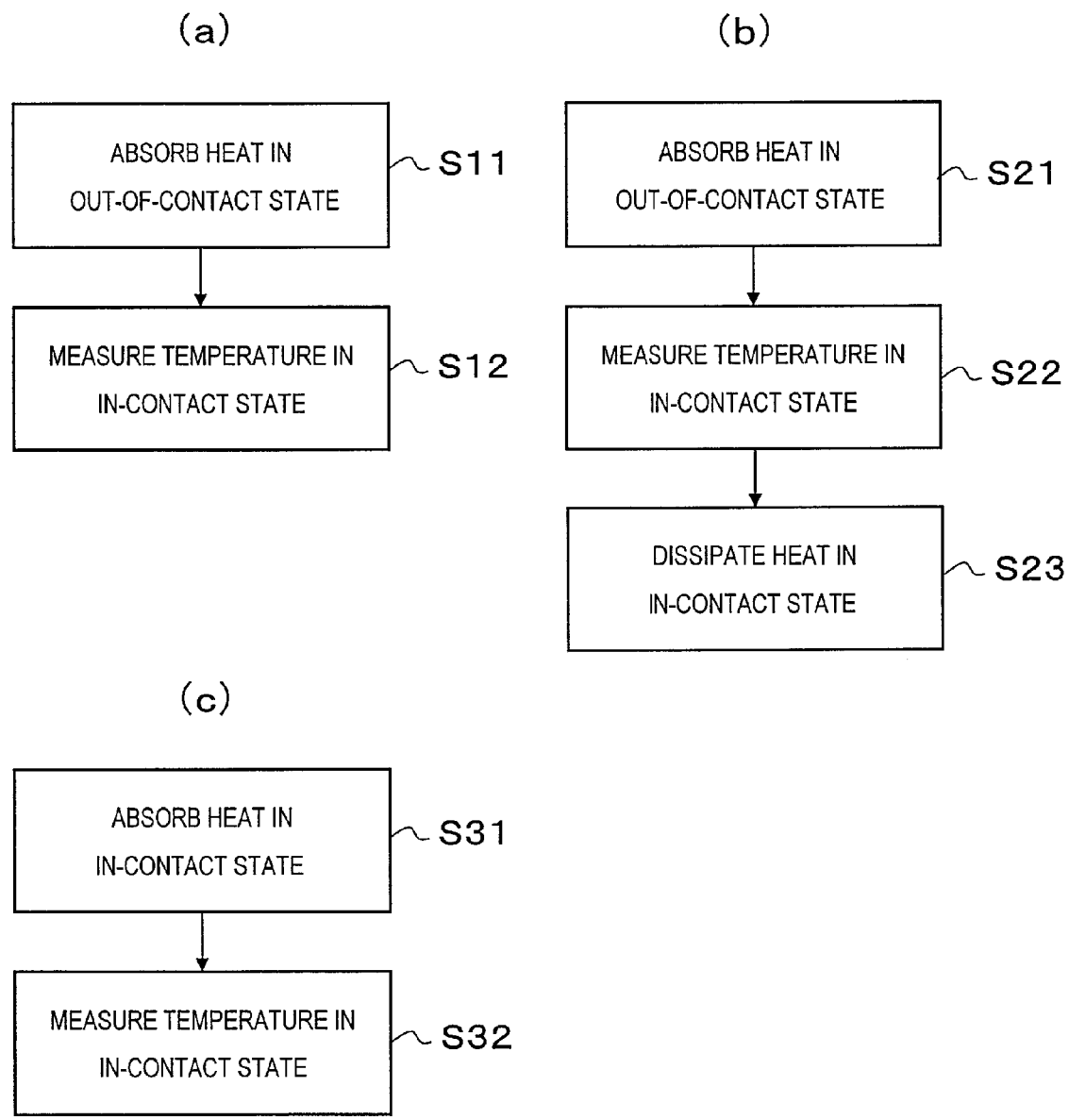
FIGS. 10(a) through 10(c) are flowcharts showing exemplary electronic device control methods according to the present invention.

In summary, according to the present invention, three different methods may be used to control an infrared sensor:

One of the three is a control method for detecting an infrared ray by performing, in this order, the process step S11 of absorbing heat while the infrared ray absorbing section and the heat sensing section are out of contact with each other and the process step S12 of detecting the temperature of the heat sensing section while the infrared ray absorbing section and the heat sensing section are in contact with each other as shown in FIG. 10(a).

Another control method is designed to detect an infrared ray by performing, in this order, the process step S21 of absorbing heat while the infrared ray absorbing section and the heat sensing section are out of contact with each other, the process step S22 of detecting the temperature of the heat sensing section while the infrared ray absorbing section and the heat sensing section are in contact with each other, and the process step S23 of letting go part of the heat that has been stored while the infrared ray absorbing section and the heat sensing section are in contact with each other as shown in FIG. 10(b). In the process step of letting go part of the heat that has been stored while the infrared ray absorbing section and the heat sensing section are in contact with each other, the quantity of heat escaping is greater than that of the heat absorbed while the infrared ray absorbing section and the heat sensing section are out of contact with each other. Still, the heat is absorbed into the infrared ray absorbing section.

According to a third control method, an infrared ray can also be detected by repeatedly performing the process step S31 of detecting the temperature of the heat sensing section while the infrared ray absorbing section and the heat sensing section are in contact with each other and the process step S32 of absorbing heat while the infrared ray absorbing section and the heat sensing section are in contact with each other as shown in FIG. 10(c).

Optionally, by using all of these three control methods while switching them, the read rates can be changed. As used herein, the term "read rate" refers to the rate of detecting an infrared ray at a particular pixel to which special attention is paid. If the read rate is the same in all pixels, that value is typically equal to the frame rate. Optionally, the read rates may be changed by varying the running times of the respective process steps. In that case, the read rate can be increased if the process step S11 or S21 of absorbing heat while the infrared ray absorbing section and the heat sensing section are out of contact with each other is shortened or if the process step S23 of letting go part of the heat that has been stored while the infrared ray absorbing section and the heat sensing section are in contact with each other is extended.

Suppose, in this case, the time constant of the temperature variation in the process step S11 of absorbing heat while the infrared ray absorbing section and the heat sensing section are out of contact with each other is $\tau 1$, the time constant of the temperature variation in the process step of letting go part of the heat that has been stored while the infrared ray absorbing section and the heat sensing section are in contact with each other is $\tau 2$, the running time of the process step of detecting the temperature of the heat sensing section while the infrared ray absorbing section and the heat sensing section are in contact with each other is t0, and one frame period is tf.

If one frame period tf satisfies the inequality tf$\geq \tau 1$+t0 to, the influence of afterimages can be reduced by setting the running time of the process step S11 of absorbing heat while the infrared ray absorbing section and the heat sensing section are out of contact with each other to be tf−t0 in the first control method.

On the other hand, if one frame period tf satisfies the inequality t0+$\tau 2 \leq$ tf<$\tau 1$+t0 to, the influence of afterimages can be reduced by setting the running times of the process steps S21 and S23 of absorbing heat while the infrared ray absorbing section and the heat sensing section are out of contact with each other and letting go part of the heat that has been stored while the infrared ray absorbing section and the heat sensing section are in contact with each other to be tf−t0−$\tau 2$ and $\tau 2$, respectively, in the second control method. Particularly if the equation tf=t0+$\tau 2$ is satisfied, the second control method becomes the same as the third control method.

Furthermore, if one frame period tf satisfies the inequality tf<t0+$\tau 2$, the influence of afterimages can be reduced as far as it is possible by setting the running time of the process step S31 of absorbing heat while the infrared ray absorbing section and the heat sensing section are in contact with each other to be tf−t0 in the third control method.

In the example described above, t0 is supposed to be fixed. But t0 could be varied, too. Also, the lengths of one frame period tf may be changed in multiple steps according to the degree of motion of a scene to shoot. Optionally, it is also possible to selectively adopt one of the first, second and third control methods according to the length of one frame period tf adopted.

These control methods are adopted with a top priority given to reducing the influence of afterimages. However, a control method for increasing the sensitivity with a certain degree of afterimage permitted may also be adopted. More specifically, the sensitivity could be increased by either extending the process step of absorbing heat while the infrared ray absorbing section and the heat sensing section are out of contact with each other or shortening the process step of letting go part of the heat that has been stored while the infrared ray absorbing section and the heat sensing section are in contact with each other, as compared to the control methods described above.

Also, the control methods have been described on the supposition that one frame period tf is varied. Alternatively, the running time of either the process step of absorbing heat while the infrared ray absorbing section and the heat sensing section are out of contact with each other or the process step of letting go part of the heat that has been stored while the infrared ray absorbing section and the heat sensing section are in contact with each other could also be varied with one frame period tf fixed.

Optionally, the read rates can also be varied with the control methods to adopt or the running times of the respective process steps changed either automatically according to the situation of the shooting scene or in accordance with the user's command.

Hereinafter, alternative preferred embodiments of an electronic device according to the present invention will be described.

Embodiment 2

Figure 11:
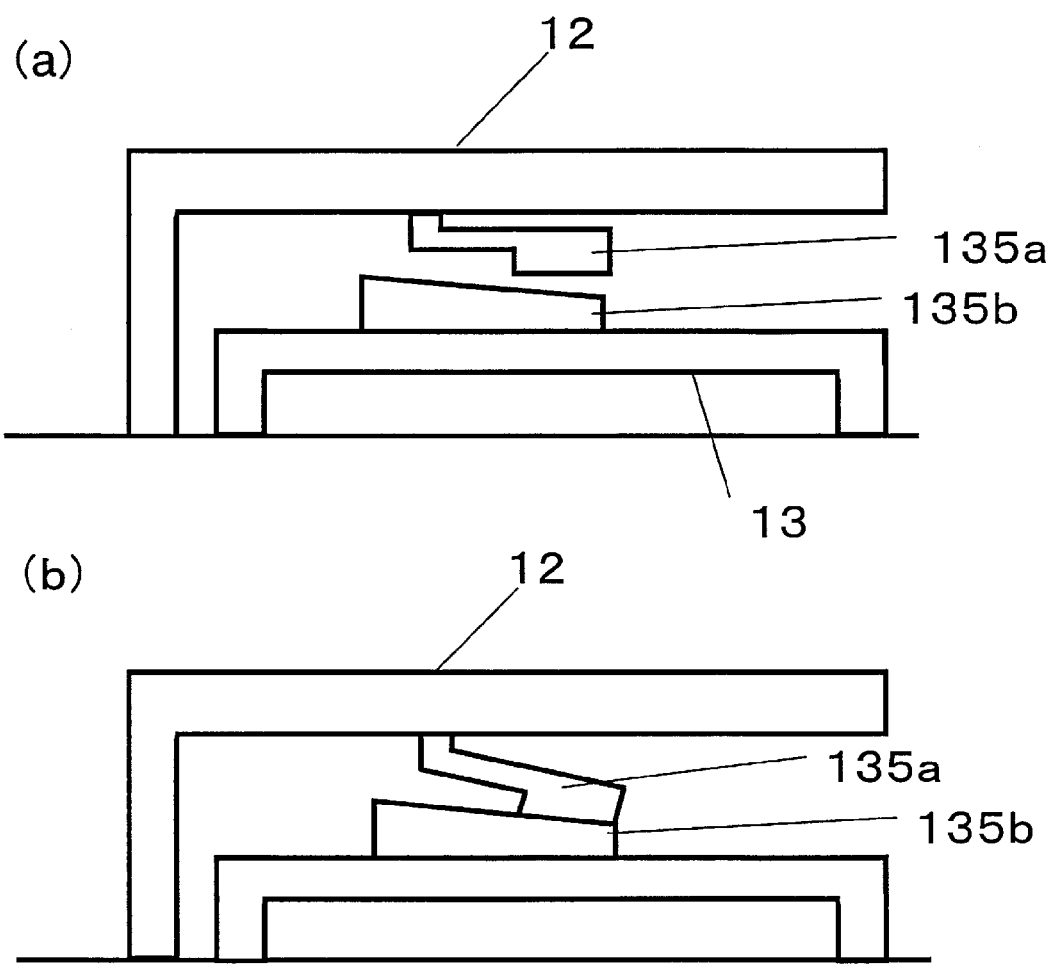
FIGS. 11(a) and 11(b) are cross-sectional views illustrating another preferred embodiment of an electronic device according to the present invention in a state where its infrared ray absorbing section 12 and heat sensing section 13 are out of contact with each other and in a state where its infrared ray absorbing section 12 and heat sensing section 13 are in contact with each other, respectively.

FIG. 11 illustrates an infrared sensor as another preferred embodiment of an electronic device according to the present invention. In this preferred embodiment, the infrared ray absorbing section 12 includes a first thermal contact portion 135a and the heat sensing section 13 includes a second thermal contact portion 135b. In this example, the first thermal contact portion 135a forms part of the infrared ray absorbing section 12 and the second thermal contact portion 135b forms part of the heat sensing section 13.

In this preferred embodiment, at least part of the first thermal contact portion 135a can either be deformed or shift thanks to the action of the driving section (not shown). That is why if at least part of the first thermal contact portion 135a is deformed or shift, the infrared ray absorbing section 12 and the heat sensing section 13 can make transitions between the in-contact and out-of-contact states as shown in FIGS. 11(a) and 11(b). For that reason, there is no need to deform the rest of the infrared ray absorbing section 12 or heat sensing section 13.

Figure 12:
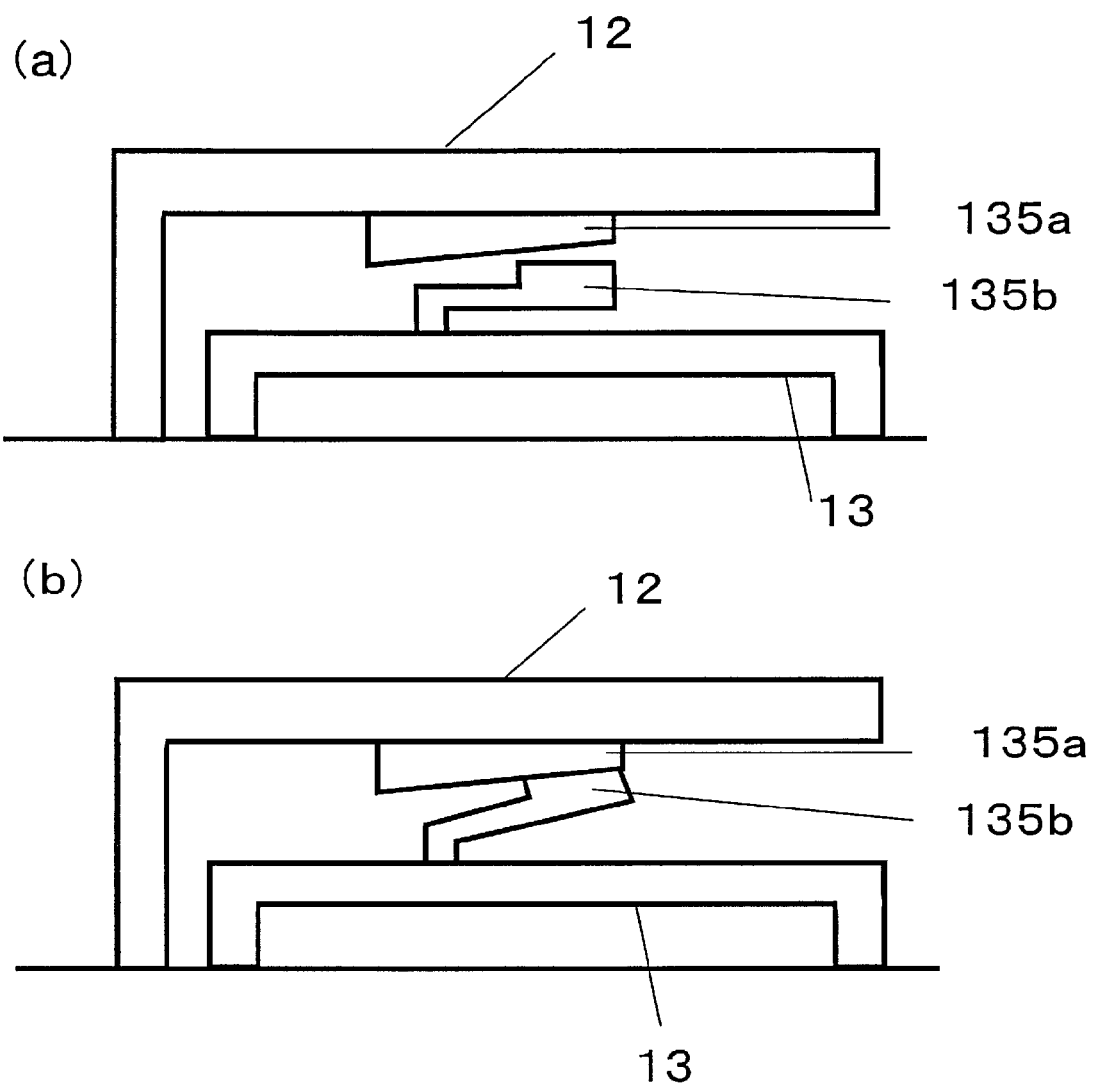
FIGS. 12(a) and 12(b) are cross-sectional views illustrating still another preferred embodiment of an electronic device according to the present invention in a state where its infrared ray absorbing section 12 and heat sensing section 13 are out of contact with each other and in a state where its infrared ray absorbing section 12 and heat sensing section 13 are in contact with each other, respectively.

FIG. 12 illustrates still another preferred embodiment, in which at least part of the second thermal contact portion 135b of the heat sensing section 13 is deformed or shifted by the driving section (not shown). As a result, the infrared ray absorbing section 12 and the heat sensing section 13 can also make transitions between the in-contact and out-of-contact states as shown in FIGS. 12(a) and 12(b).

Figure 13:
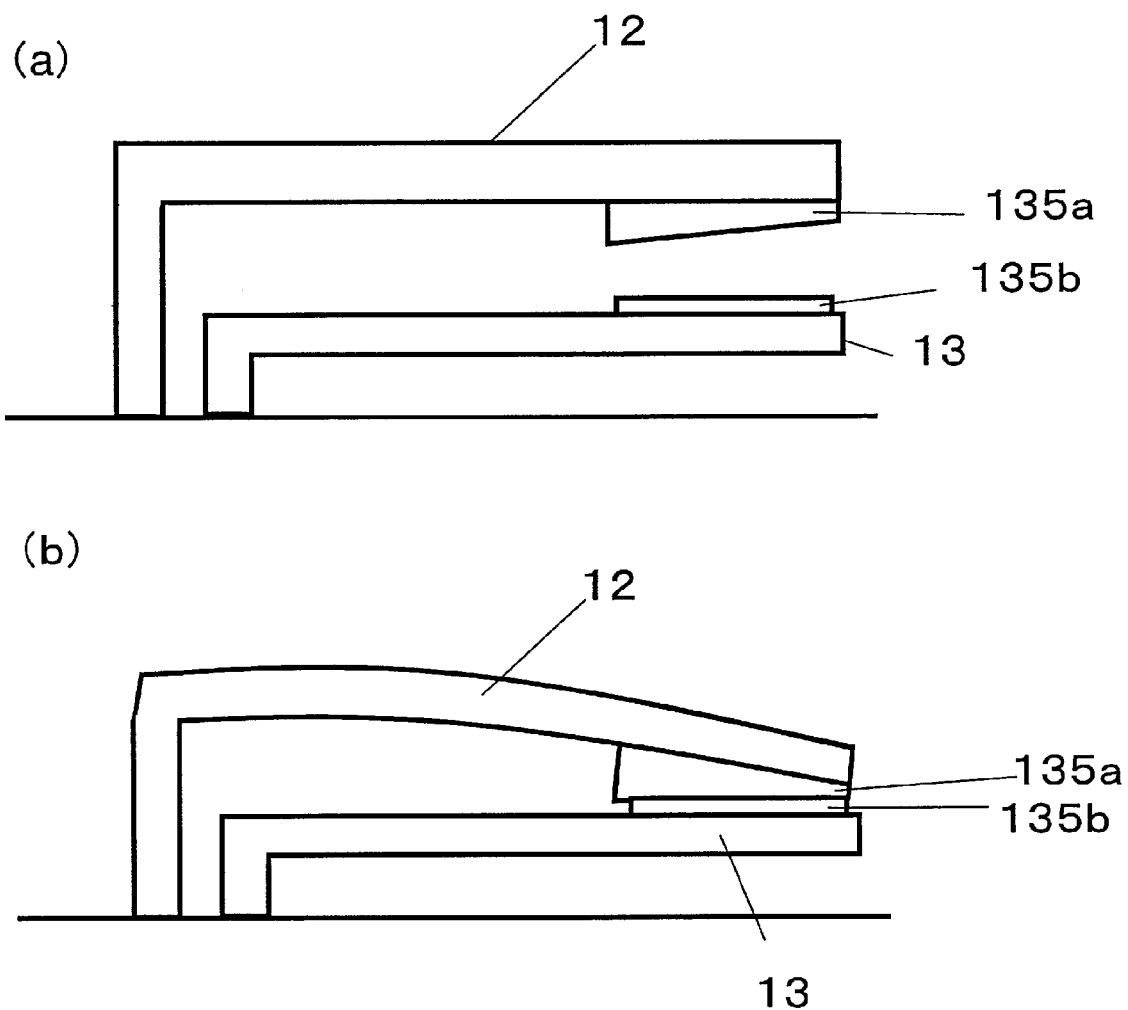
FIGS. 13(a) and 13(b) are cross-sectional views illustrating yet another preferred embodiment of an electronic device according to the present invention in a state where its infrared ray absorbing section 12 and heat sensing section 13 are out of contact with each other and in a state where its infrared ray absorbing section 12 and heat sensing section 13 are in contact with each other, respectively.
Figure 14:
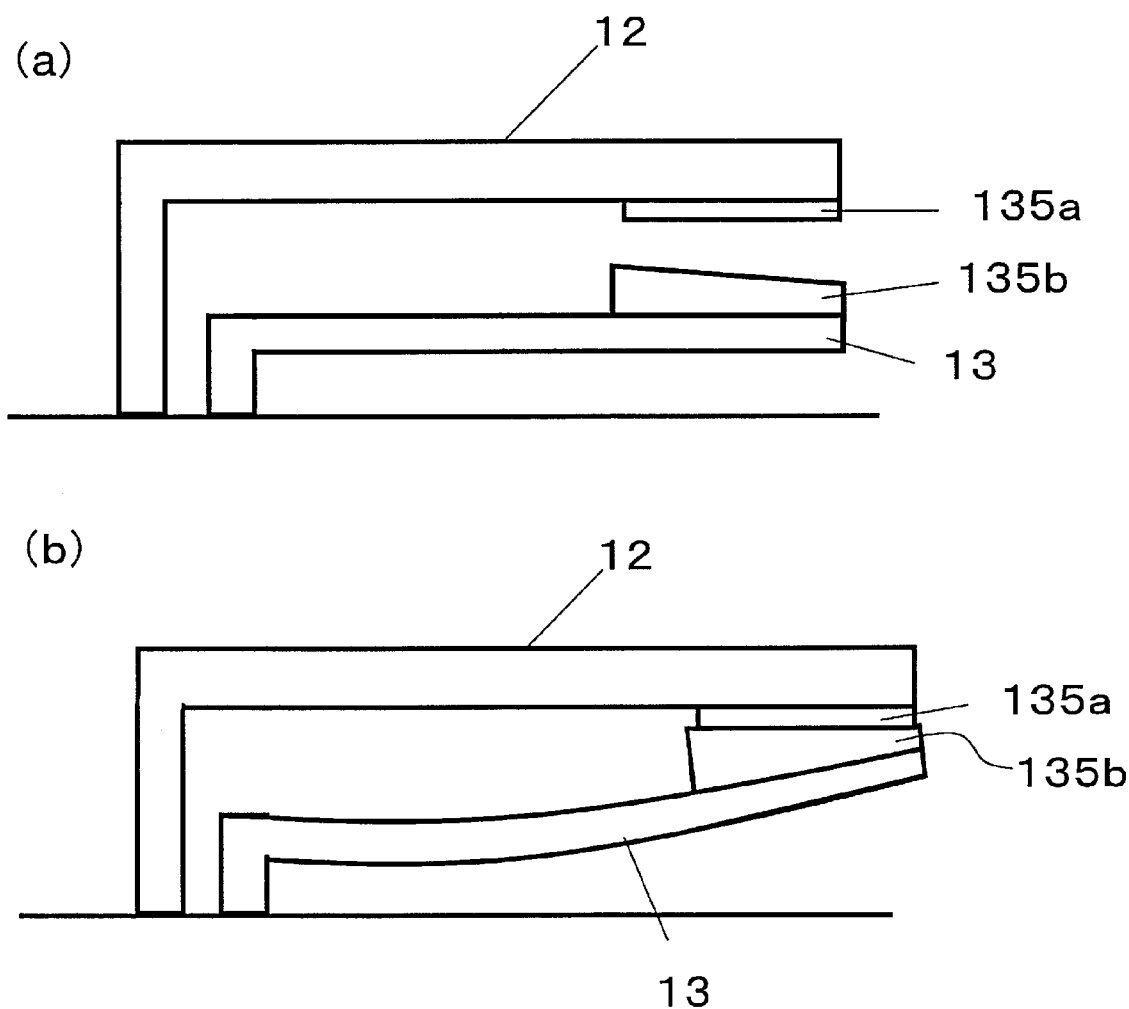
FIGS. 14(a) and 14(b) are cross-sectional views illustrating yet another preferred embodiment of an electronic device according to the present invention in a state where its infrared ray absorbing section 12 and heat sensing section 13 are out of contact with each other and in a state where its infrared ray absorbing section 12 and heat sensing section 13 are in contact with each other, respectively.

FIGS. 13 and 14 illustrate two other preferred embodiments. In these preferred embodiments, the infrared ray absorbing section 12 includes a first thermal contact portion 135a, the heat sensing section 13 includes a second thermal contact portion 135b and at least a portion of the infrared ray absorbing section 12 or heat sensing section 13 is made of an elastic material. The driving section (not shown) deforms at least a portion of that elastic material, thereby changing the states of the infrared ray absorbing section 12 and heat sensing section 13 between the in-contact and out-of-contact states as shown in FIGS. 13(a), 13(b), 14(a) and 14(b). Optionally, both the infrared ray absorbing section 12 and the heat sensing section 13 may be made of an elastic material. In the illustrated examples, a portion of the infrared ray absorbing section 12 or heat sensing section 13 that is parallel to the substrate is supposed to be deformed. However, the sensor may also be designed such that any other portion is deformed. For example, a portion of the infrared ray absorbing section 12 or heat sensing section 13 that is perpendicular to the substrate may also be deformed. That is to say, a portion corresponding to the absorbing section supporting member or the heat sensing section supporting member in the other preferred embodiments may be deformed, too.

optionally, to change the states of the infrared ray absorbing section 12 and heat sensing section 13 between the in-contact and out-of-contact states, the elastic force of the elastic member, electrostatic force, electromagnetic force or any other force may be used. For example, as already described for another preferred embodiment, the electrostatic force produced by electrostatic induction may be used to change the states into the in-contact state and elastic force may be used to change the states into the out-of-contact state. Alternatively, the electrostatic force produced by electrostatic induction may be used to change the states into the out-of-contact state and elastic force may be used to change the states into the in-contact state. In the latter example, a pair of electrodes that faces each other may be provided for the substrate and the heat sensing section and the electrostatic force caused by electrostatic induction between those electrodes may be used. In that case, the infrared ray absorbing section does not have to be provided with any electrode and can have a simplified structure. Still alternatively, electrostatic force produced by electrostatic induction may also be used to change the states both into the out-of-contact state and into the in-contact state.

Also, to change the states of the infrared ray absorbing section 12 and heat sensing section 13 between the in-contact and out-of-contact states, a piezoelectric element, a magnetostrictive actuator, an actuator that uses a shape memory alloy, an actuator that uses thermal expansion or any other type of actuator may be used. Alternatively, an actuator that uses a conductive polymer material or a polymer actuator may also be used.

The thermal contact portions 135, 135a and 135b may have any arbitrary shapes. Also, in changing the states of the infrared ray absorbing section 12 and the heat sensing section 13 between the in-contact and out-of-contact states, the directions and magnitudes of shifts of the infrared ray absorbing section 12 and heat sensing section 13 may be defined arbitrarily. The larger the area of contact between the infrared ray absorbing section 12 and heat sensing section in the in-contact state, the more quickly the heat can be transferred between the infrared ray absorbing section 12 and the heat sensing section 13 and the better. The thermal contact portions 135, 135a and 135b could be made of a metal or any other suitable material with high thermal conductivity.

INDUSTRIAL APPLICABILITY

An electronic device according to the present invention can be used effectively as an infrared image sensor with high sensitivity.

The invention claimed is:

1. An electronic device comprising:
    at least one infrared ray absorbing section, which comes to have an increased temperature when irradiated with an incident infrared ray;
    at least one heat sensing section, of which a physical property varies with the variation in temperature;
    a detector circuit section for sensing the variation in the physical property of the heat sensing section; and
    a driving section, which is able to change the states of the infrared ray absorbing section and the heat sensing section from a first state, in which the absorbing and sensing sections are in contact with each other, into a second state, in which these two sections are out of contact with each other, and vice versa.

2. The electronic device of claim 1, wherein the infrared ray absorbing section overlaps the heat sensing section.

3. The electronic device of claim 1, comprising a substrate with the detector circuit section,
    wherein the infrared ray absorbing section is supported on the substrate with an absorbing section supporting member, which is made of either an insulator or a semiconductor.

4. The electronic device of claim 3, wherein the infrared ray absorbing section includes a plurality of upper electrodes that store electrical charge, and
    wherein the heat sensing section includes a plurality of lower electrodes that store electrical charge, of which the polarity is opposite to that of the electrical charge in the upper electrode, the lower electrodes facing the upper electrodes, and
    wherein the upper electrodes are electrically connected together.

5. The electronic device of claim 1, wherein the infrared ray absorbing section is supported on the heat sensing section with an absorbing section supporting member, which is made of either an insulator or a semiconductor.

6. The electronic device of claim 1, wherein the heat sensing section and the detector circuit section are electrically connected together, and wherein the infrared ray absorbing section and the detector circuit section are not connected together with an interconnect.

7. The electronic device of claim 1, wherein at least one of the infrared ray absorbing section and the heat sensing section has a thermal contact portion that protrudes toward the other section.

8. The electronic device of claim 7, wherein the driving section changes the first and second states by either deforming or shifting at least a part of the thermal contact portion.

9. The electronic device of claim 1, wherein the driving section changes the first and second states by either deforming or shifting at least a part of the heat sensing section and the infrared ray absorbing section.

10. The electronic device of claim 1, wherein the detector circuit section detects the quantity of the infrared ray by sensing the variation in the physical property.

11. A method for controlling an electronic device, the device including: an infrared ray absorbing section, which comes to have an increased temperature when irradiated with an incident infrared ray; at least one heat sensing section, of which a physical property varies with the variation in temperature; a detector circuit section for sensing the variation in the physical property of the heat sensing section; and a driving section, which is able to change the states of the infrared ray absorbing section and the heat sensing section from a first state, in which the absorbing and sensing sections are in contact with each other, into a second state, in which these two sections are out of contact with each other, and vice versa, the method comprising the steps of:

irradiating the infrared ray absorbing section with the infrared ray; and measuring the temperature of the heat sensing section in the first state in which the infrared ray absorbing section and the heat sensing section are in contact with each other.

12. The method of claim 11, wherein the step of irradiating the infrared ray absorbing section with the infrared ray is performed in the second state in which the infrared ray absorbing section and the heat sensing section are out of contact with each other.

13. The method of claim 11, comprising the step of letting go at least part of heat in the first state after the step of measuring the temperature of the heat sensing section has been performed in the first state in which the infrared ray absorbing section and the heat sensing section are in contact with each other.

14. The method of claim 11, wherein the step of irradiating the infrared ray absorbing section with the infrared ray is performed in a selected one of the first and second states in which the infrared ray absorbing section and heat sensing section are either in contact with each other or out of contact with each other.

* * * * *